(12) United States Patent
Borra

(10) Patent No.: US 12,484,642 B2
(45) Date of Patent: Dec. 2, 2025

(54) BELT WITH A BATTERY

(71) Applicant: Daniel Borra, Surrey (GB)

(72) Inventor: Daniel Borra, Surrey (GB)

( * ) Notice: Subject to any disclaimer, the term of this patent is extended or adjusted under 35 U.S.C. 154(b) by 0 days.

(21) Appl. No.: 18/796,808

(22) Filed: Aug. 7, 2024

(65) Prior Publication Data

US 2025/0072529 A1   Mar. 6, 2025

(30) Foreign Application Priority Data

Aug. 30, 2023   (GB) ...................... 2313154

(51) Int. Cl.
| | | |
|---|---|---|
| *A41D 31/04* | (2019.01) | |
| *A41D 1/00* | (2018.01) | |
| *A44B 11/02* | (2006.01) | |
| *H01M 10/46* | (2006.01) | |
| *H01M 10/48* | (2006.01) | |
| *H01M 50/247* | (2021.01) | |
| *H01M 50/256* | (2021.01) | |
| *A41D 13/00* | (2006.01) | |

(Continued)

(52) U.S. Cl.
CPC ............. *A41D 1/002* (2013.01); *A44B 11/02* (2013.01); *H01M 10/46* (2013.01); *H01M 10/488* (2013.01); *H01M 50/247* (2021.01); *H01M 50/256* (2021.01); *H01M 2220/30* (2013.01); *H02G 11/02* (2013.01); *H02J 7/0047* (2013.01)

(58) Field of Classification Search
CPC ....... A41D 1/002; A44B 11/02; A44B 11/005; H01M 10/46; H01M 10/488; H01M 50/247; H01M 50/256; H01M 2220/30; H02G 11/02; H02J 7/0047; A41F 9/025
See application file for complete search history.

(56) References Cited

U.S. PATENT DOCUMENTS 2,304,367 A * 12/1942 Meyer ..................... F21V 21/00
                                                                    224/660
3,692,253 A *  9/1972 Curran .................. B60R 22/353
                                                                    242/381.4

(Continued)

FOREIGN PATENT DOCUMENTS

CN        211127168 U    7/2020
CN        213188287 U    5/2021

(Continued)

OTHER PUBLICATIONS

Mechanical Parameters of Leather . . . ; https://pmc.ncbi.nlm.nih.gov/articles/PMC9331295/; Jul. 2022 (Year: 2022).*

(Continued)

*Primary Examiner* — Robert H Muromoto, Jr.
(74) *Attorney, Agent, or Firm* — Sam Pierce

(57) ABSTRACT

A belt with at least one rechargeable battery including a buckle housing that contains the a rechargeable battery and a reel adjustment mechanism to adjust length of one or more belt member including a reel that accepts a cord associated with the proximal end of the belt member(s) and a dial connected to the reel that is turned to adjust length of the belt member(s) extending from the buckle housing. The rechargeable battery is connected to or connectable to a charging cable for connecting to an electrical device to be charged or for connection to a power supply to charge the rechargeable battery.

19 Claims, 19 Drawing Sheets

(51) Int. Cl.
*H02G 11/02* (2006.01)
*H02J 7/00* (2006.01)

(56) References Cited

U.S. PATENT DOCUMENTS

| | | | | |
|---|---|---|---|---|
| 3,913,977 A * | 10/1975 | Takada | B60R 22/357 | |
| | | | 297/476 | |
| 3,919,615 A * | 11/1975 | Niecke | H02J 7/0042 | |
| | | | 224/663 | |
| 5,019,767 A * | 5/1991 | Shirai | H02J 7/0042 | |
| | | | D13/110 | |
| 5,211,321 A * | 5/1993 | Rodriguez | A45F 5/00 | |
| | | | 224/604 | |
| 5,592,528 A * | 1/1997 | Nelson | H02J 7/0045 | |
| | | | 455/67.11 | |
| 5,713,749 A * | 2/1998 | Wu | H02J 7/0042 | |
| | | | 439/518 | |
| 6,066,211 A * | 5/2000 | Sandell | H01M 50/247 | |
| | | | 15/327.5 | |
| 6,097,982 A * | 8/2000 | Glegyak | A61N 1/3904 | |
| | | | 607/5 | |
| 6,211,649 B1 * | 4/2001 | Matsuda | G06F 1/266 | |
| | | | 320/115 | |
| 6,573,621 B2 * | 6/2003 | Neumann | H02J 7/02 | |
| | | | 320/114 | |
| 6,641,433 B2 * | 11/2003 | Devine | H01R 31/06 | |
| | | | 439/505 | |
| 7,471,060 B2 * | 12/2008 | Raghunath | H02J 50/70 | |
| | | | 320/107 | |
| 8,212,521 B2 * | 7/2012 | Choi | H02J 7/0044 | |
| | | | 320/112 | |
| 8,359,716 B2 * | 1/2013 | Fiedler | A44B 11/266 | |
| | | | 24/652 | |
| 8,430,434 B2 * | 4/2013 | Fiedler | A44B 11/2592 | |
| | | | 292/251.5 | |
| 8,484,809 B2 * | 7/2013 | Fiedler | A45C 13/1069 | |
| | | | 70/160 | |
| 8,620,395 B2 * | 12/2013 | Kang | H04M 1/02 | |
| | | | 361/752 | |
| 8,739,371 B2 * | 6/2014 | Fiedler | A45C 13/1069 | |
| | | | 24/303 | |
| 8,814,016 B2 * | 8/2014 | Murdoch | A45F 3/005 | |
| | | | 224/648 | |
| D730,278 S * | 5/2015 | Licciardello, Jr. | D13/103 | |
| D738,303 S * | 9/2015 | Symons | D13/108 | |
| 9,252,612 B2 * | 2/2016 | Baluha | H02J 7/0044 | |
| D817,268 S * | 5/2018 | Symons | D13/108 | |
| 10,049,541 B2 * | 8/2018 | Ewen, III | G08B 13/1418 | |
| 10,050,453 B2 * | 8/2018 | Miller | H02J 7/0042 | |
| 11,452,632 B2 * | 9/2022 | Kramer | A61F 5/32 | |
| D1,000,934 S * | 10/2023 | Büttner | D8/349 | |
| D1,008,602 S * | 12/2023 | Büttner | D34/35 | |
| D1,009,401 S * | 12/2023 | Schaub | D34/35 | |
| 2003/0121682 A1 * | 7/2003 | Carrancho | B25F 5/02 | |
| | | | 173/217 | |
| 2006/0112572 A1 * | 6/2006 | McCambridge | B26B 19/3873 | |
| | | | 30/537 | |
| 2008/0048612 A1 * | 2/2008 | Yang | H02J 7/342 | |
| | | | 320/108 | |
| 2009/0015198 A1 * | 1/2009 | Brandenburg | H02J 7/0044 | |
| | | | 320/115 | |
| 2009/0102419 A1 * | 4/2009 | Gwon | H02J 50/402 | |
| | | | 320/108 | |
| 2010/0013433 A1 * | 1/2010 | Baxter | G07F 15/003 | |
| | | | 320/109 | |
| 2010/0320969 A1 * | 12/2010 | Sakakibara | H01M 50/213 | |
| | | | 429/61 | |
| 2011/0133695 A1 * | 6/2011 | Cadway | H01M 50/213 | |
| | | | 320/114 | |
| 2012/0048588 A1 * | 3/2012 | Iyoda | H01M 50/20 | |
| | | | 173/217 | |
| 2012/0062179 A1 * | 3/2012 | Kuo | G06F 1/266 | |
| | | | 320/115 | |
| 2012/0104999 A1 * | 5/2012 | Teggatz | H01F 38/14 | |
| | | | 336/200 | |
| 2012/0196658 A1 * | 8/2012 | Sun | H04M 1/0274 | |
| | | | 455/573 | |
| 2012/0262116 A1 * | 10/2012 | Ferber | H02J 7/0044 | |
| | | | 429/163 | |
| 2013/0150134 A1 * | 6/2013 | Pliner | H04M 1/026 | |
| | | | 320/111 | |
| 2013/0257348 A1 * | 10/2013 | Baluha | H02J 7/0044 | |
| | | | 320/107 | |
| 2014/0117926 A1 * | 5/2014 | Hwu | H02J 50/10 | |
| | | | 320/108 | |
| 2014/0125283 A1 * | 5/2014 | Yang | H02J 7/0044 | |
| | | | 320/115 | |
| 2014/0180365 A1 * | 6/2014 | Perryman | A61N 1/321 | |
| | | | 607/60 | |
| 2015/0091500 A1 * | 4/2015 | Claudepierre | H02J 50/10 | |
| | | | 320/108 | |
| 2016/0093417 A1 * | 3/2016 | Litterini | H01R 31/06 | |
| | | | 174/135 | |

FOREIGN PATENT DOCUMENTS

JP  2003306819 A * 10/2003
WO  2016/056759 A1  4/2016

OTHER PUBLICATIONS

A Basic Guide to USB; https://www.digikey.com/en/articles/a-basic-guide-to-usb?msockid=0247af28f3ab62aa11a1bacbf20e63c8; Jan. 2018 (Year: 2018).*

* cited by examiner

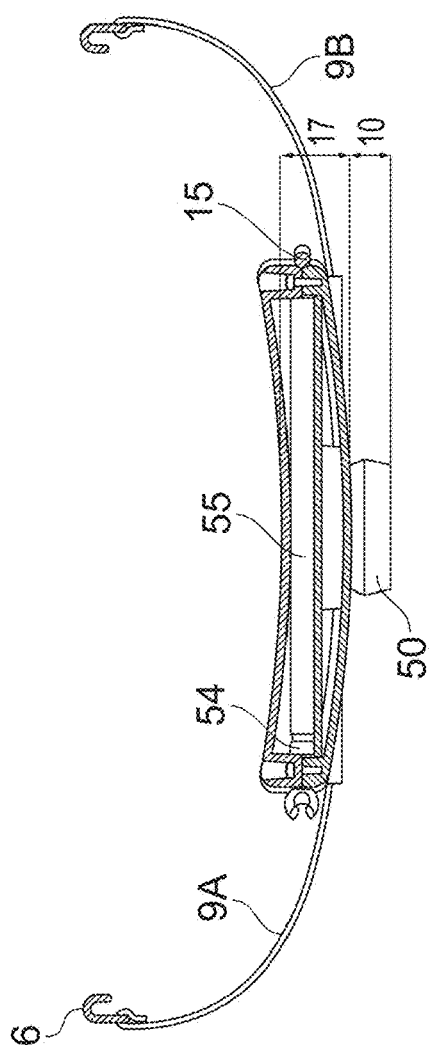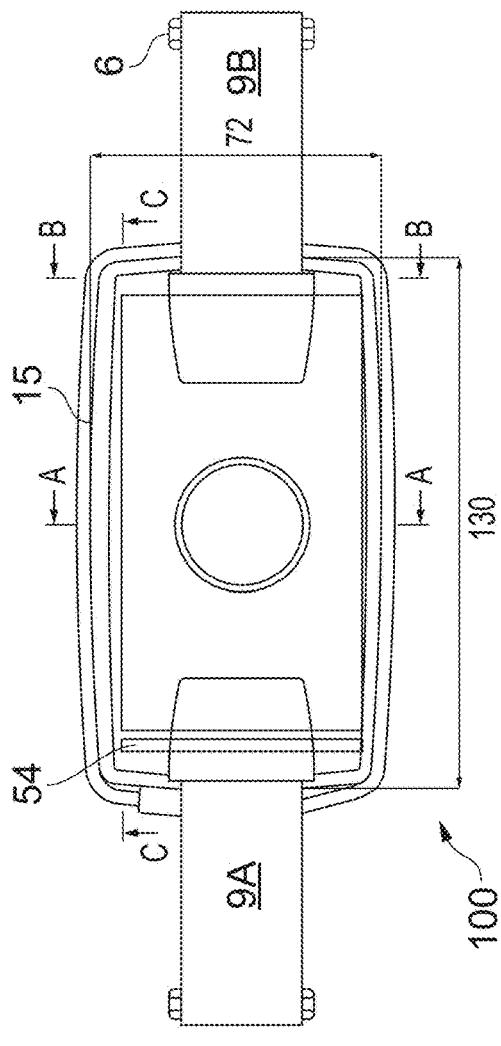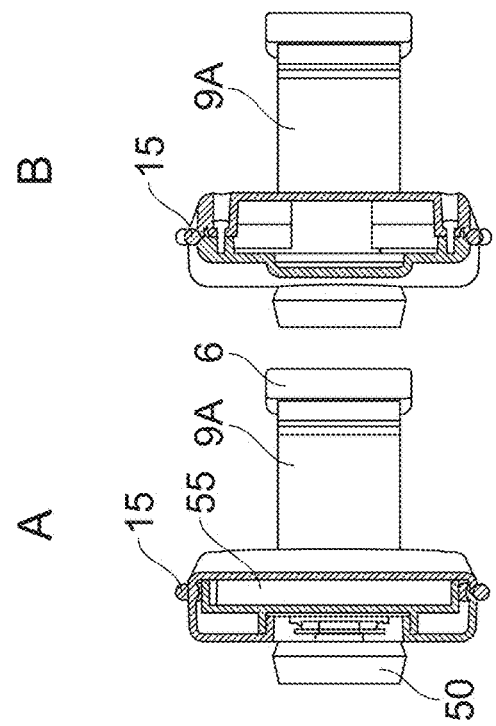

BELT WITH A BATTERY

FIELD OF THE INVENTION

The present invention relates to a belt, in particular a belt with a battery to provide portable access to a charging means.

BACKGROUND

In many societies across the world it is increasingly necessary to have access to electricity, as more people become increasingly dependent on electrical equipment.

In many situations such need is mobile, for example when a person is travelling or outdoors, they may require a source of electricity to recharge a mobile telephone or similar electronic device.

PRIOR ART

CN 213 188 287 (YAN) discloses a multifunctional belt comprises a belt head, a belt body and a tail buckle, the interior of the belt head is divided into two spaces through a partition plate, the two spaces are a connecting part and an installing part respectively, the connecting part is provided with a locking fastener matched with the tail buckle for locking, the installing part is internally provided with a control circuit board, a wire winder and a charging wire, the charging wire is wound on the wire winder, and the tail buckle is arranged on the charging wire.

CN 211 127 168 (XIE) discloses a waistband type high-capacity mobile power supply comprises a waistband body and a waistband head, a plurality of rechargeable batteries connected in parallel, the rechargeable batteries embedded in the waistband body, and electrically connected with the mobile power supply charging and discharging module; and the mobile power supply charging and discharging module is fixedly arranged on the waistband body.

WO 2016 056 759 (KIM) discloses a multifunctional belt, comprises: a buckle part including an electrical connection port; a belt part of which one end is electrically connected and fixed to the buckle part, of which the other end is decoupled from or coupled to the buckle part, and including at least one battery electrically connected to the electrical connection port; and a power supply unit formed at one side of the buckle part or the belt part, and electrically connected to the battery so as to supply power to an external communication device.

SUMMARY OF THE INVENTION

According to a first aspect of the invention there is provided a belt with at least one rechargeable battery comprising: a buckle housing that contains the at least one rechargeable battery; wherein the buckle housing has an adjustment mechanism to adjust length of at least one belt member extending from the buckle housing and wherein the at least one rechargeable battery is connected to or connectable to a charging cable for connecting to an electrical device to be charged or for connection to a power supply to charge the rechargeable battery.

In this way the belt is worn by a user and can provide a portable charging means to enable a user to charge electrical devices, such as a smartphone when away from a mains power supply. Advantageously as the belt is typically worn around at least part of a wearer's waist the charging cable is easily accessible.

Advantageously the belt therefore has a dual function of securing clothing around a waist of a user and for charging of electrical devices without affecting the flexibility of the belt and the wearing comfort.

It is appreciated that the battery on the belt may be used even when not worn as a traditional belt. For example the belt may be secured around a wearer's arm or secured to a bag or placed on a surface such as a table to provide a portable power supply.

The buckle housing is a point at which the belt member or belt members are secured and adjusted by the adjustment mechanism. The proximal end of the belt member, or if there is more than one belt member, the proximal end of at least one of the belt members, that is received into the buckle housing is connected to the adjustment mechanism. This enables length of a belt member to be adjusted.

The buckle housing is also shaped and dimensioned to contain the at least one rechargeable battery.

Preferably the buckle housing has a moulded inner cavity for holding the at least one rechargeable battery so that each battery is held securely in place and is protected by the buckle housing. The buckle housing also provides a barrier between the wearer and the rechargeable battery(s) that may become warm or hot during use.

The buckle housing is typically formed from lightweight durable materials such as synthetic plastics, carbon fibre, metal, or metal alloys. It is appreciated that in some embodiments the buckle housing may be formed from a combination of materials.

The buckle housing also houses the adjustment mechanism for altering length of the belt members so that it can be easily fitted to a wearer.

In some embodiments an inner facing surface of the buckle housing may have loops for receiving a traditional belt. In this way a user has the option to use the buckle housing with their own preferred belt, rather than using the belt members and adjustment mechanism. It is therefore appreciated that in some embodiments the belt members may be removable from the buckle housing in such a way that they can be reattached when required. For example, part of the buckle housing may open to allow access to the proximal ends of the belt members so that they can be released and attached to the adjustment mechanism as required. Alternatively the belt members may be retractable to, or storable within, the buckle housing when not in use.

In a preferred embodiment the buckle housing is curved to correspond to the shape of a user's waist for enhanced comfort and fit.

The belt member is at least one length of material that extends from the buckle housing and passes around at least part of the waist of a wearer. The belt member(s) may be secured by either connecting to part of a garment or by forming a complete loop around the waist of a wearer.

The belt members have attachment means at a distal end to enable quick, easy, and reliable connection of the belt members to a garment and/or to a second part and/or to each other.

For example, in some embodiments the belt member has attachment means that enable securing to belt loops on a garment (belt passes around part of a wearer's waist), or that enable the belt member(s) to form a continuous loop itself (passing around the whole of a wearer's waist) or that enable connection to a second section so that the belt member and a second section(s) form a continuous loop around the whole of a wearer's waist).

In some embodiments the belt member is not elastic so that the belt member does not stretch and length can only be adjusted using the adjustment mechanism. For example the belt member may be formed from webbing.

In other embodiments the belt member may be formed from an elastic material or include an elastic portion to provide some additional adjustment.

In a preferred embodiment there are two belt members, one belt member extending from each opposed end of the buckle housing. The two belt members are elongate lengths of material with at least one of the proximal ends connected to the adjustment mechanism in the buckle housing and the distal ends extending therefrom.

Preferably, both proximal ends of the belt members are connected to the adjustment mechanism so that both parts can be adjusted in length to increase the range of adjustment.

Preferably the distal ends of the two belt members have an attachment means (such as a clip or hook) to join the distal ends of the belt members to the waist of a garment. For example, in a preferred embodiment the attachment means can hook onto belt loops of a waist band of a garment such as a pair of shorts or trousers. As the adjustment mechanism is tightened the belt cinches part of the waist band which ensures the belt is connected securely and acts to fit the waistband to the wearer. This makes the belt quick and easy to don with no requirement to pass the belt member fully around the wearer's waist.

Ideally in this embodiment the two belt members are dimensioned to only pass across a front region of a wearer's waist so that the belt can be easily attached. For example the attachment means may connect to belt loops at a side region of the wearer's waist.

In some embodiments with two belt members these may be dimensioned to pass fully around a wearer's waist and be connected together (to each other) to form a continuous loop.

In an alternative embodiment the belt member connects to a second section that is a separate part to form a continuous loop around a wearer's waist. Typically there are two belt members, one extending from each opposed end of the buckle housing (as described above) and the second section joins the distal ends of the belt members thereby forming a loop.

The distal ends of the belt members have an attachment means (such as a clip, hook, buckle or interlocking component) to join the distal ends to the second section and thereby form a continuous loop around a wearer's waist. In this way the belt can be removed by disconnection at either of the attachment means so that the user selected length remains and substantial adjustment is not required when fitting the belt. This makes the belt quick and easy to don.

Typically in this embodiment the belt members connect to the second section at the sides of a wearer's waist so that the attachment means can be easily reached to disconnect the belt member from the second section. In this embodiment the attachment means may preferably be interlocking or engaging corresponding parts which when connected form a secure connection. For example, if a preferred embodiment the attachment means comprises hook and eye clasps.

The adjustment mechanism enables the length of the belt member(s) to be adjusted. The adjustment mechanism is arranged on and/or in the buckle housing.

In a preferred embodiment the adjustment mechanism is a reel mechanism connected to the belt member(s). Examples of a suitable reel mechanism include but are not limited to Fidlock Winch (RTM) mechanisms that are used for fastening solutions or BOA (RTM) dials that are often used to secure laces. By using this type of reel mechanism the length of the belt member(s) can be changed by turning the reel using a dial to store more of the belt member (which typically includes cord/wire at the proximal end which is part of the belt member) on the reel or to release more of the belt member from the reel.

It is appreciated that the terms cord and wire are interchangeable and that either term may be used.

In a preferred embodiment the adjustment mechanism has a dial arranged on the front of the buckle housing which connects to a reel. The cord or wire of the belt member is wound to and from the reel, which is engaged with or connected to the dial, so that as the dial is turned cord/wire is wound around the reel or unwound from the reel to enable adjustment. The cord/wire always engages with the reel but is also connected to the reel and/or to the dial so that the cord/wire cannot be pulled free from the adjustment mechanism during use.

In use, the cord/wire is connected to a proximal end of the belt member and to the adjustment mechanism, so that the cord/wire can be wound around the reel of the adjustment mechanism, to allow length of the belt member to be adjusted by turning the dial that is in communication with the reel which winds cord/wire around or from the reel. For example, in an embodiment of the belt that has two belt members that extend from opposed sides of the buckle housing, both proximal ends may be connected to the reel of the adjustment mechanism by a cord that is connected to and wraps around the reel. A user can then adjust length of both belt members that extend from either side of the buckle housing by turning the dial which simultaneously turns the reel.

It is appreciated that when using a reel mechanism a user may turn the dial in either direction to intuitively tighten or loosen the belt member, or the dial may be turned in one direction to tighten and may have a release mechanism to free the cord/wire and thereby permit the belt member(s) to be freed to loosen (unwind from the reel) without having to turn the dial. Advantageously this allows the wire/cord to be unwound by pulling the belt member(s). In this type of embodiment of the adjustment mechanism the wire/cord is preferably connected to the dial as well as the reel so that when either; the dial is displaced from the reel the dial remains connected by the wire/cord; or the dial and reel are connected and are together both released from a base to release the cord/wire so it can be unwound from the reel without having to turn the dial.

The dial and reel may connect by a mechanical connection such as and interference fit, an interlocking mechanism, or by magnetic means, or a combination of these, so that a user must apply force to separate the dial from the reel which in turn releases the wire/cord so that the belt member(s) can be pulled to lengthen from the buckle housing. In this embodiment where the dial and the reel engage there is an engagement means so that the dial drives the reel and movement can be locked to prevent cord unwinding from the reel. The engagement means may comprise a gear or a ratchet mechanism to enable incremental adjustment.

In some preferred embodiments the dial and reel are connected to form a single part that receives the cord/wire and the single part is received to a base when tightening is required. For example the base may be mounted on or in the buckle housing and the single part is arranged to be received to the base. The single part (dial and reel) may connect by a mechanical connection such as and interference fit, an interlocking mechanism, or by magnetic means, or a combination of these so that when connected tightening can occur, and when disconnected the cord/wire is free to unwind from the reel when the belt members are pulled. In this embodiment the single part and the base may engage by an engagement means so that movement of the single part with respect to the base can be locked to prevent cord unwinding from the reel. The engagement means may include, but is not limited to a gear, a ratchet mechanism or similar to enable incremental adjustment and to prevent unintentional unwinding.

It is appreciated that for optimal adjustment there are two belt members, one extending from each side of the buckle housing and that the proximal end of each buckle member is connected to the same cord which is connected to the reel. Advantageously this enables the option for only one length or loop of cord and for both belt members to be simultaneously tightened when turning the dial.

In another embodiment a separate cord may be provided for each belt member and both cords may be arranged on the same reel.

In a preferred embodiment the adjustment mechanism is a Fidlock Winch (RTM) mechanism, which has a reel that accepts a cord associated with the proximal ends of the belt member(s) and a dial connected to the reel that is turned to adjust length of the belt member(s). For example proximal ends of two belt members may have a loop through which a cord passes and extends to the reel of the Fidlock Winch (RTM). The cord is engaged with the reel (typically tied to loops provided on the reel) so that as the reel is turned by the dial the cord is wound about the reel. The dial and reel are connected forming a single part that is received by a base that is fixed to the buckle housing.

The dial and reel of Fidlock Winch mechanism connect to form a single part that connects to the base by a magnetic connection. The base and single part engage by a ratchet type mechanism (engagement means) so that incremental adjustment can be achieved and unwinding is prevented until the magnetic connection between the single part and the base is broken to release the single part from the base. For tightening the single part (reel and dial) are arranged on the base engaging by an engagement means and the dial is turned so that cord is wound around the reel to shorten the belt member(s). The single part is disconnected from the base by breaking the magnetic connection to release the adjustment mechanism so that the ratchet mechanism is disengaged and thereby the belt members can be extended by pulling the from the buckle housing instead of unwinding the dial.

It is appreciated that preferably the cord which is considered part of the belt member may be contained within the profile of the housing during use and is not visible when worn.

The rechargeable battery is connected to, or connectable to a charging cable for connecting to an electrical device to be charged or for being connected to a power source. In this way the charging cable may be used to charge the rechargeable battery(s) from a power source, or to charge an electrical device from the rechargeable battery.

Preferably the charging cable has a plug for connection to a port (socket) on the rechargeable battery so that the charging cable can be removed/exchanged/replaced as required. In this way the charging cable need only be attached during charging and when not in use no cable is connected. Advantageously this means that the belt appears as a traditional belt when not used for charging.

In a preferred embodiment the cable is at least 100 mm long and ideally no longer than 150 mm long so that an electrical device being charged can be connected to the battery and stored in a pocket on the garment without any excess cable hanging from the wearer.

In some embodiments a first charging cable may be provided to charge the battery and a second charging cable may be used to charge an electrical device. It is appreciated that in some preferred embodiments one charging cable may perform both functions.

In some embodiments the charging cable may be permanently fixed to the rechargeable battery. In this type of embodiment a storage means is provided for the charging cable when it is not in use. For example the cable may be wrapped around the buckle housing or stored within the buckle housing.

In some embodiments the charging cable has a plurality of plugs at a distal end for receiving different electrical devices. In this way one cable can be used to charge multiple different devices.

In preferred embodiments the charging cable has a universal serial bus plug provided on at least one end, such as USB-C.

In some embodiments the buckle housing may be shaped and dimensioned to provide a storage compartment or region for the charging cable(s).

For example, in some embodiments a perimeter edge of the housing may include a groove which a cable wrapped around the housing can be stored when not in use. For example the cable is connected at one end (a proximal end with reference to the battery) and the remaining cable may wound into the groove around the buckle housing. Part of the housing may have clips to secure a cable end and/or part of the cable length. In this way the charging cable is readily accessible and easily stored.

In some embodiments of the belt the buckle housing has a storage compartment for the charging cable to allow the cable to be displaced and stored or for the unused portion of the cable can be stored conveniently when not in use.

In some embodiments of the belt there is a cable wheel for storing the charging cable(s). In this way the charging cable can be unwound when required for use and wound onto the wheel when the charging cable is not in use. Preferably the wheel is arranged in or on the buckle housing so that the wheel is substantially contained.

In preferred embodiments the rechargeable battery is a 5000 Milliampere-hour (mAh) battery which is typically sufficient to provide at least one complete charge for a smartphone. In some embodiments the battery is a 10000 mAh battery to provide greater charging capacity.

In some embodiments the buckle casing may include an indicator to reveal charging status and/or charge level of the battery(s). For example the buckle housing may include at least one light to indicate when charging is in progress and/or to indicate if the battery is low in charge. The at least one light emitting diode (LED) may be in communication with the battery and connected to a processor that is programmed to display a first light sequence, or light colour when charging is in progress and to display a second light sequence or colour when battery level is low. In some embodiments the buckle casing may include a display to provide status and charge information. For example the battery charge level may be displayed as a percentage number. It is appreciated that in embodiments of the invention that include one or more indicator there may be a printed circuit board (PCB) to connect the components.

In some embodiments the belt may include a button or switch on the buckle housing to enable charging.

A preferred embodiment of the invention will now be described by way of example only and with reference to the Figures in which:

BRIEF DESCRIPTION OF FIGURES

FIGS. 3B, 3C and 3D shows cross section views A, B and C of the belt shown in FIG. 3A;

DETAILED DESCRIPTION OF FIGURES

Figure 1A:
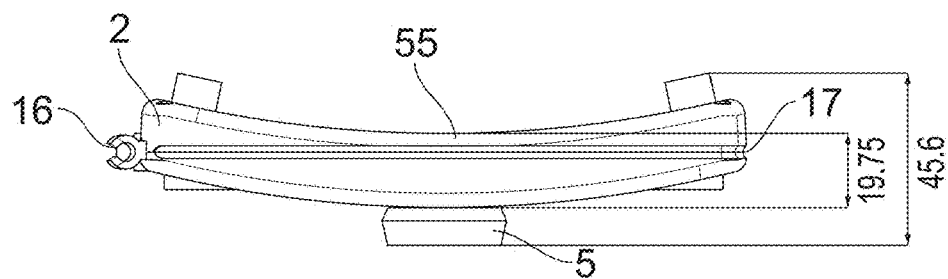
FIG. 1A shows a side view of a first embodiment of the buckle housing without the belt member.
Figure 1B:
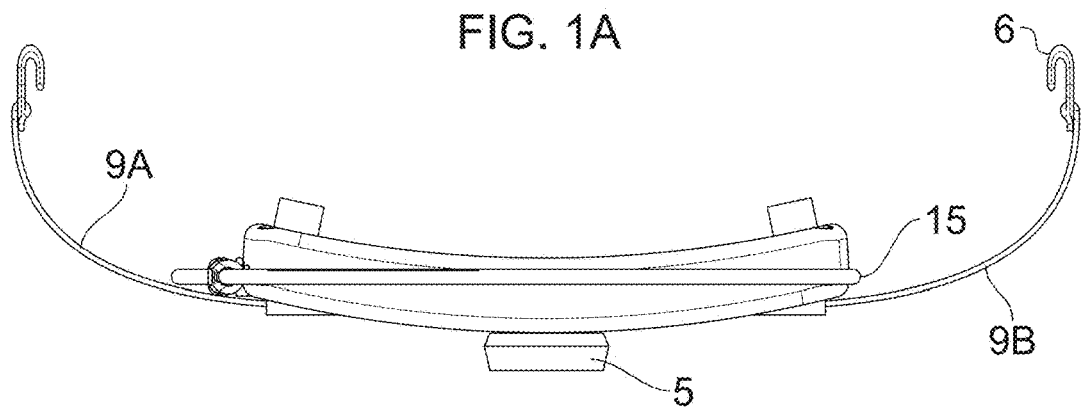
FIG. 1B shows a side view of the first embodiment of the buckle housing with a belt member.
Figure 1C:
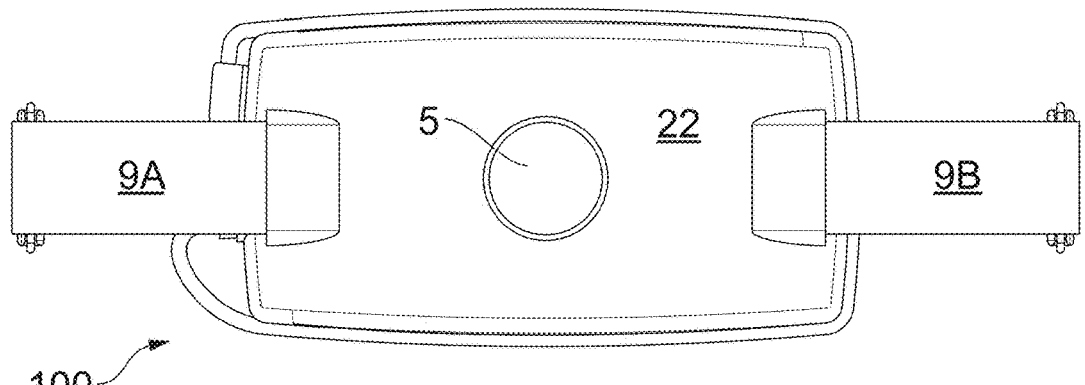
FIG. 1C shows a top view of the belt shown in FIG. 1B.
Figure 1D:
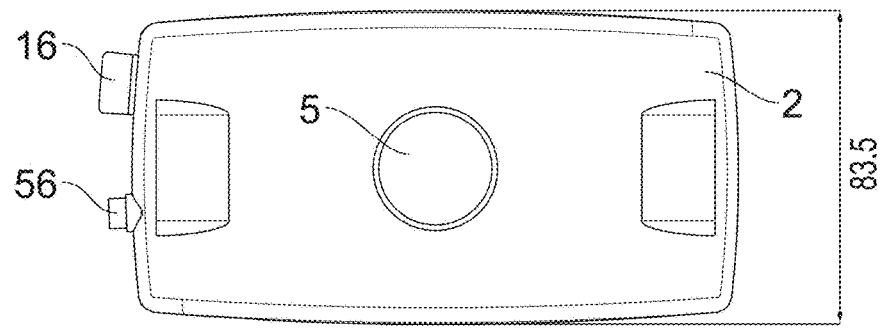
FIG. 1D shows a top view of the buckle housing shown in FIG. 1A.
Figure 2A:
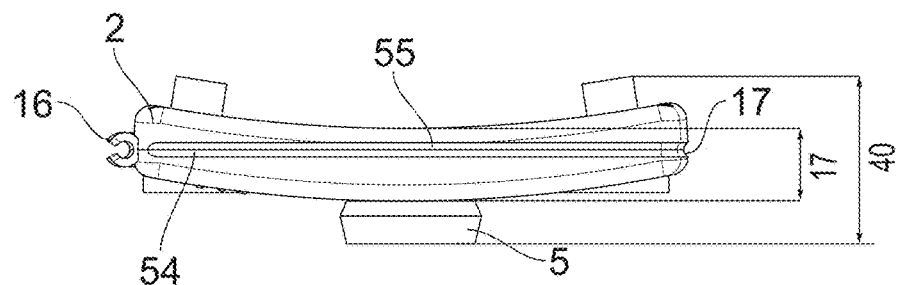
FIG. 2A shows a side view of a second embodiment of the buckle housing without the belt member.
Figure 2B:
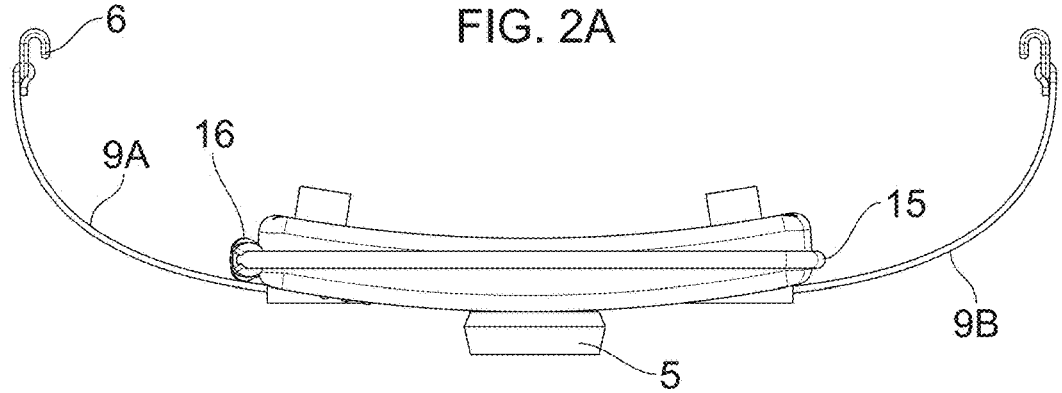
FIG. 2B shows a side view of the second embodiment of the buckle housing with a belt member.
Figure 2C:
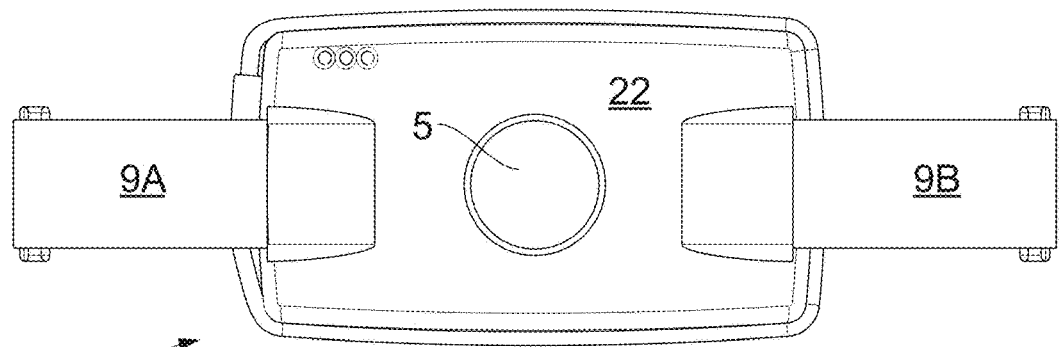
FIG. 2C shows a top view of the belt shown in FIG. 2B.
Figure 2D:
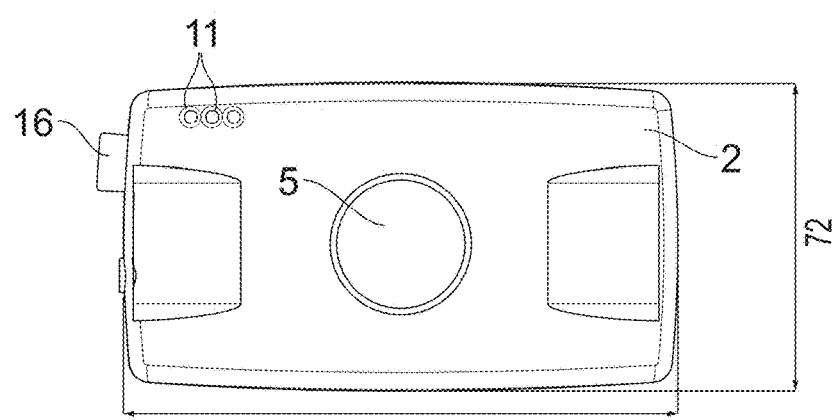
FIG. 2D shows a top view of the buckle housing shown in FIG. 2A.
Figure 4:
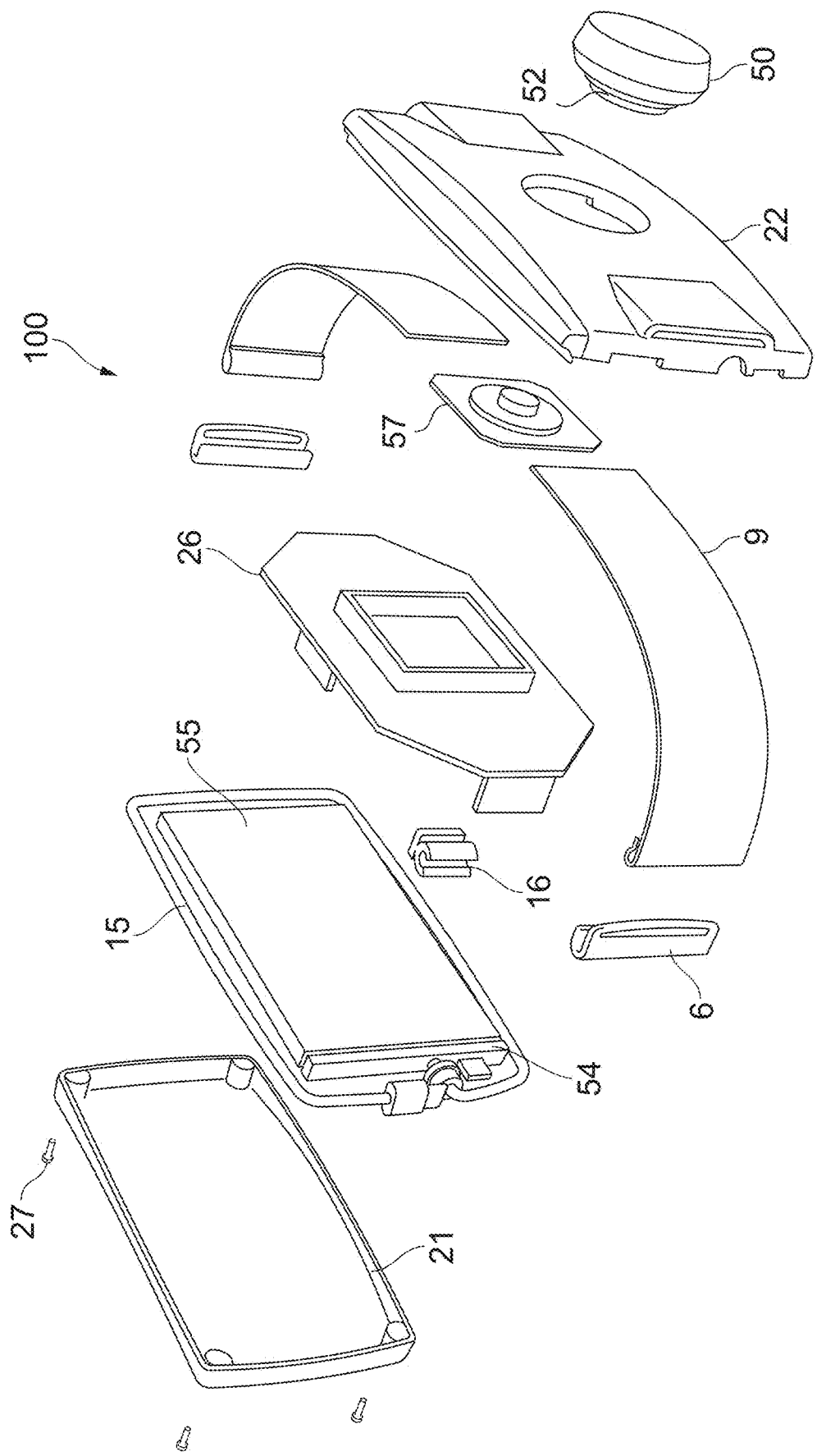
FIG. 4 shows an exploded view of the belt shown in FIGS. 1A to 1D.
Figure 5:
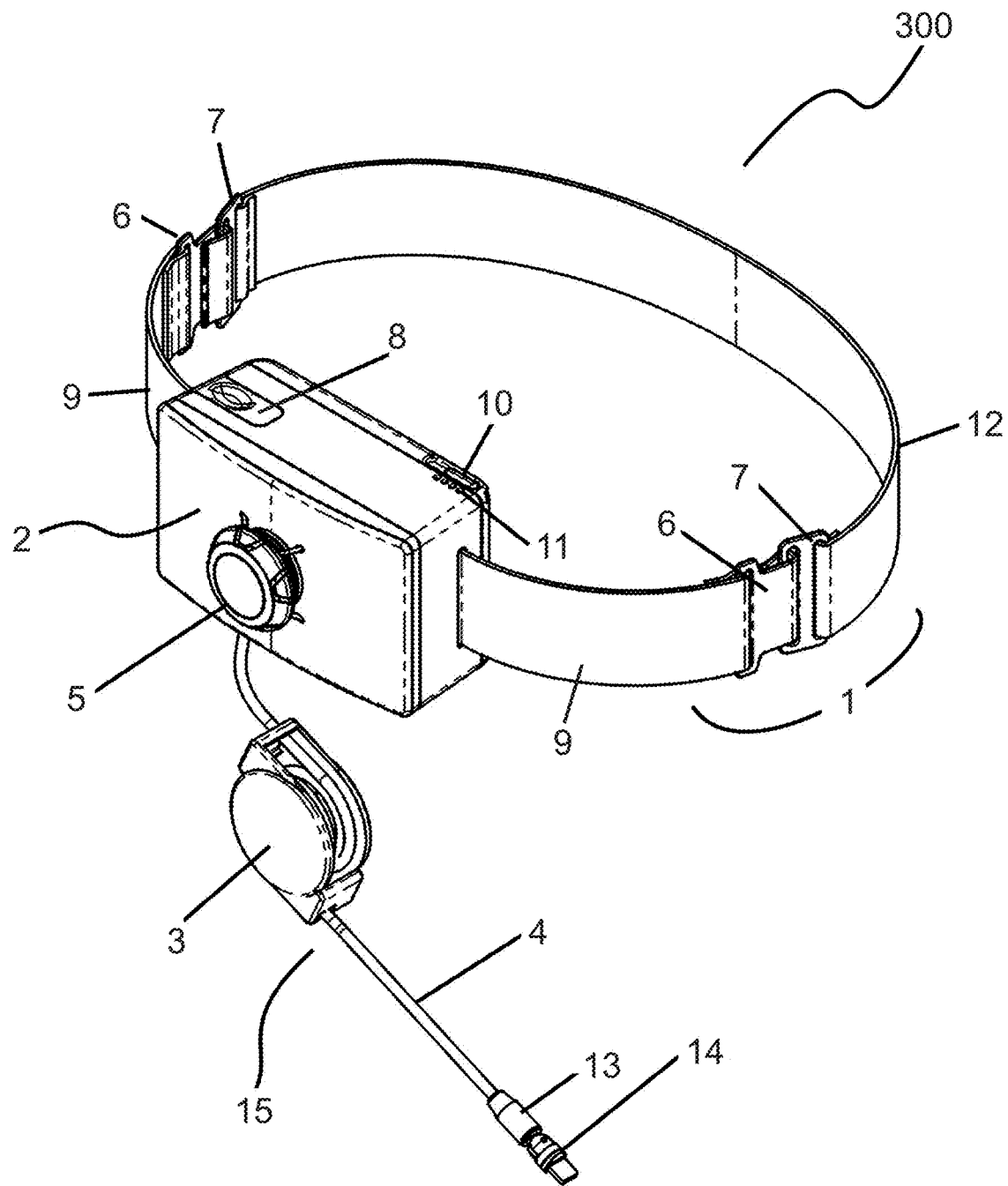
FIG. 5 shows an isometric view of a third embodiment of the belt.
Figure 6:
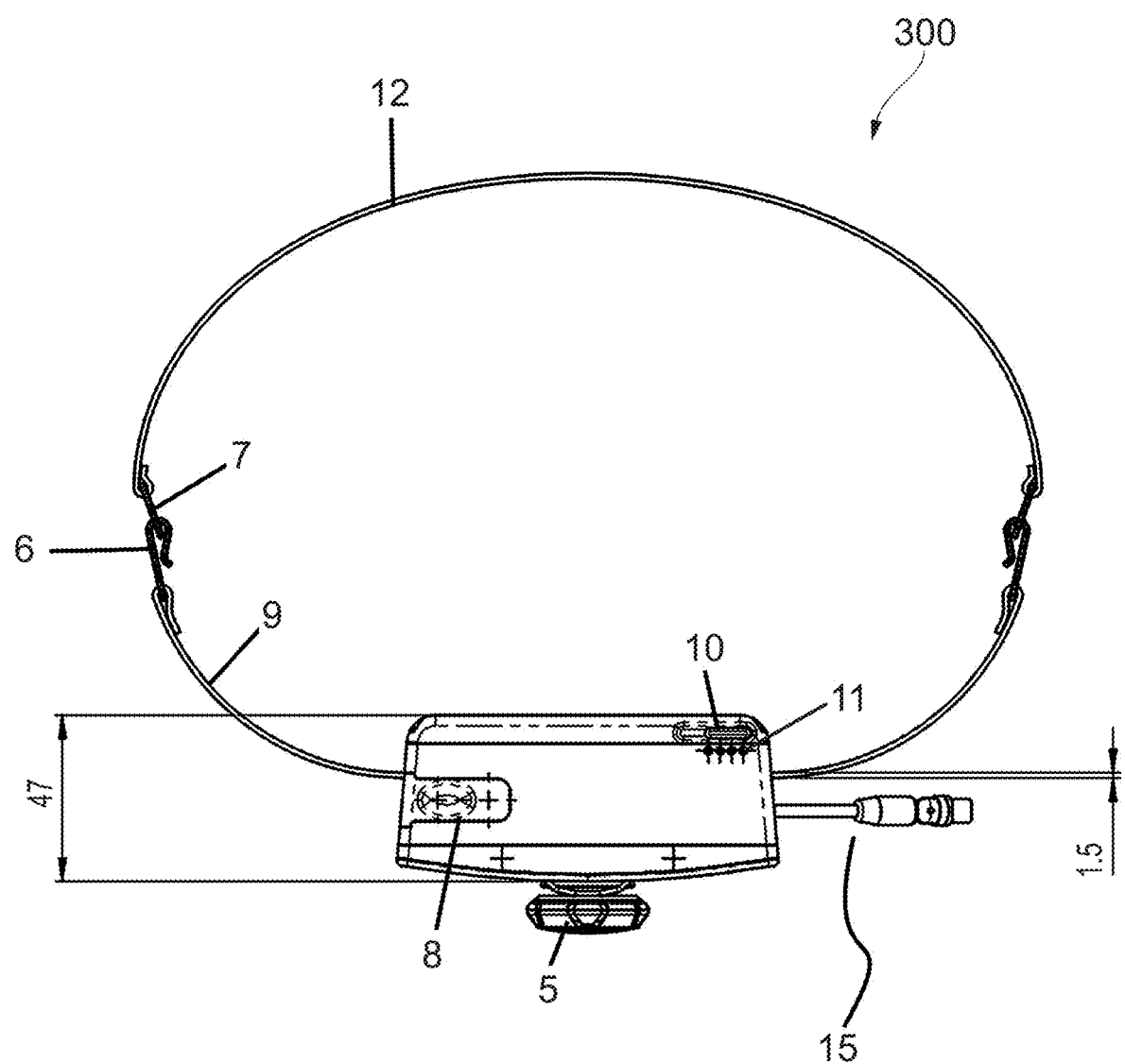
FIG. 6 shows a top view of the third embodiment of the belt as shown in FIG. 5.
Figure 7:
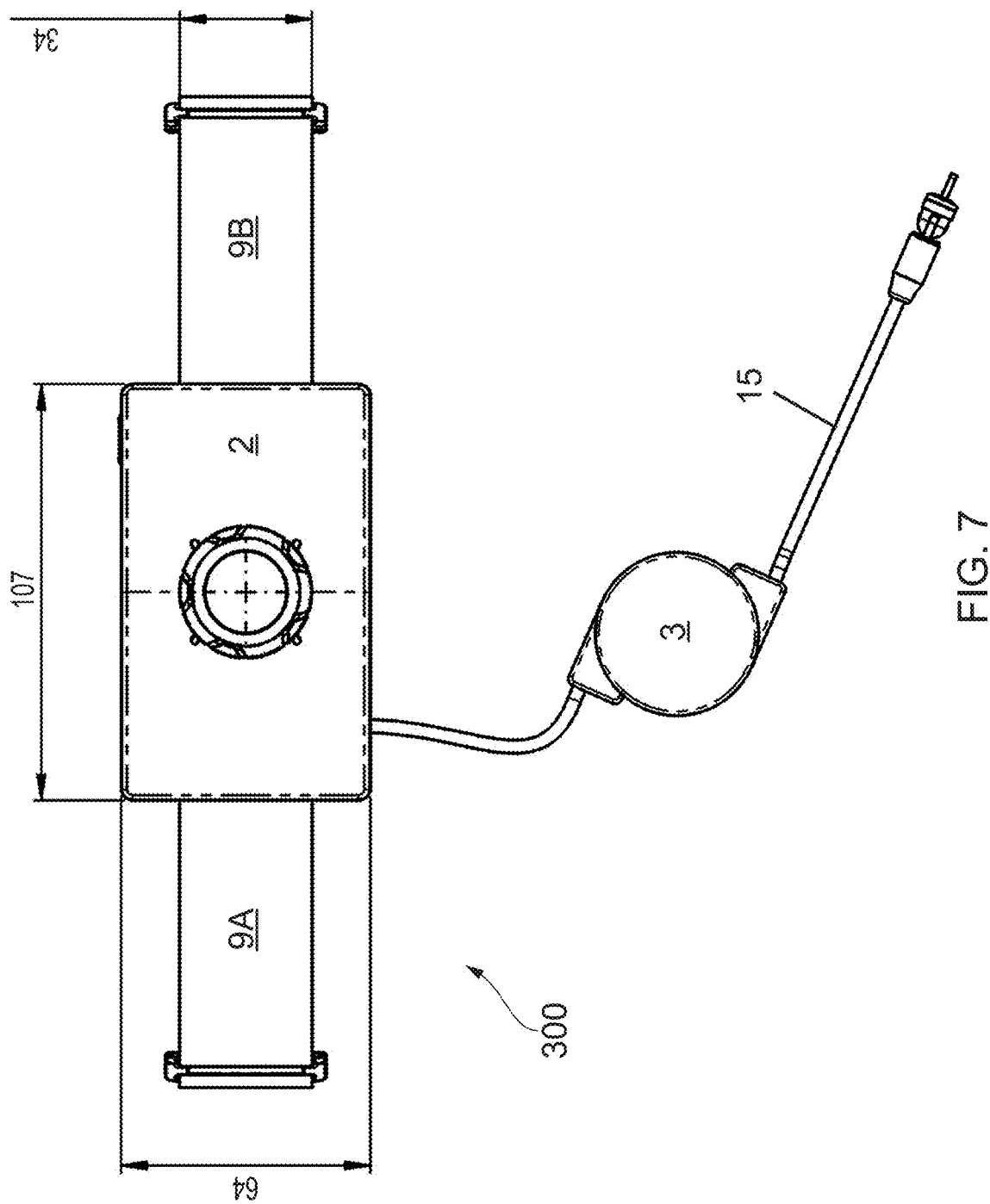
FIG. 7 shows a front view of the third embodiment of the belt as shown in FIG. 5.
Figure 8:
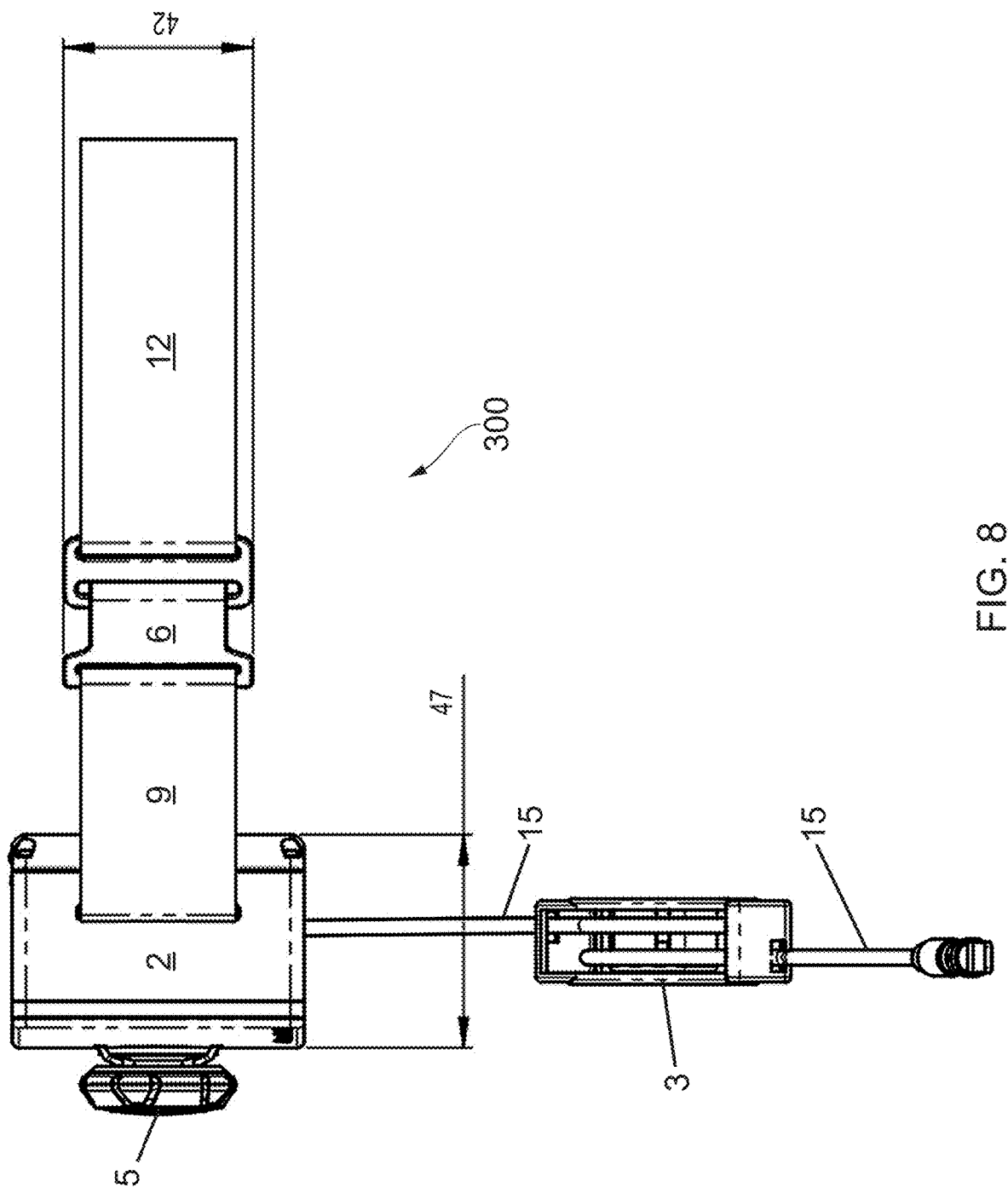
FIG. 8 shows a front view of the third embodiment of the belt as shown in FIG. 5.
Figure 9:
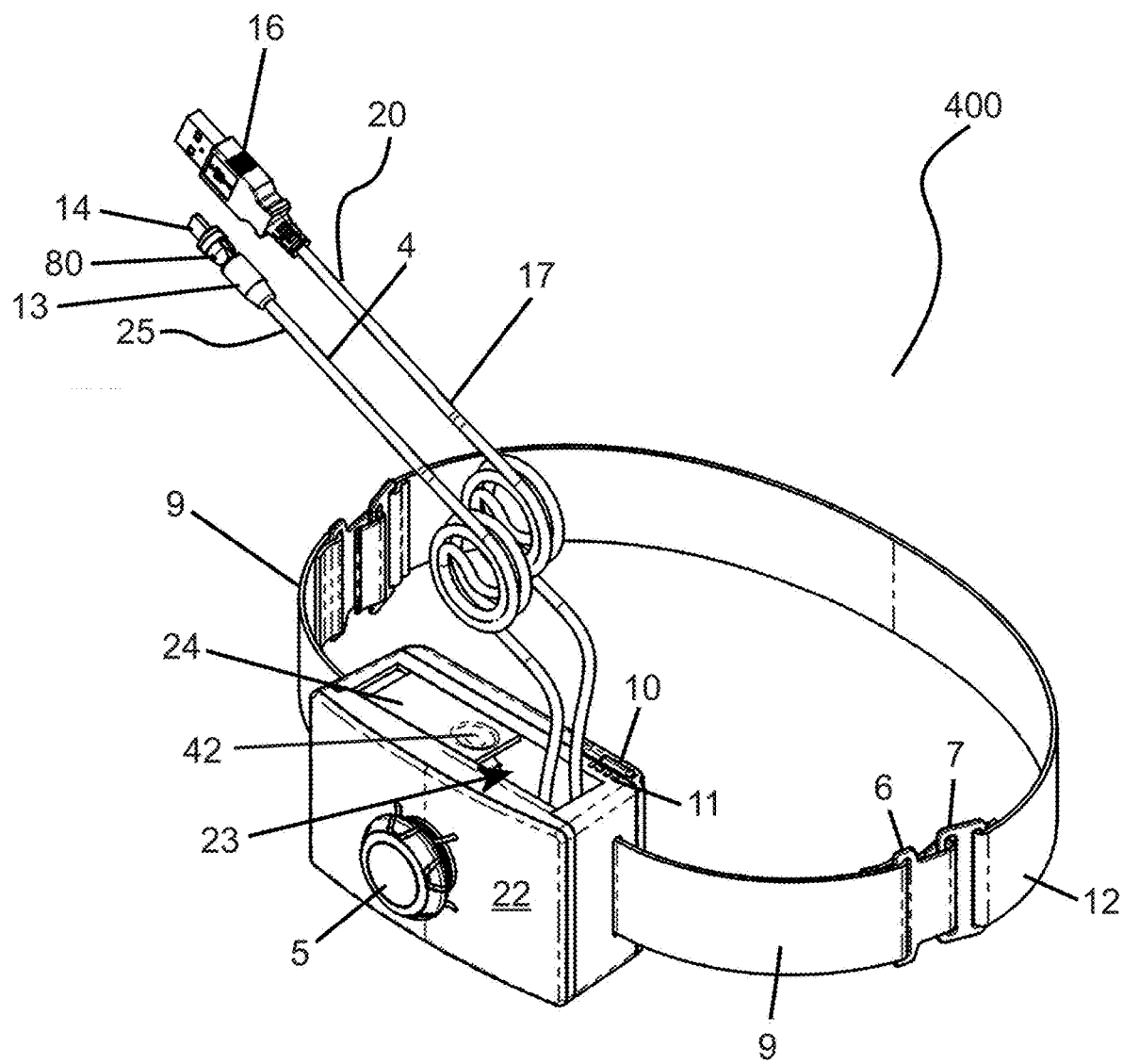
FIG. 9 shows an isometric view of a fourth embodiment of the belt.
Figure 10:
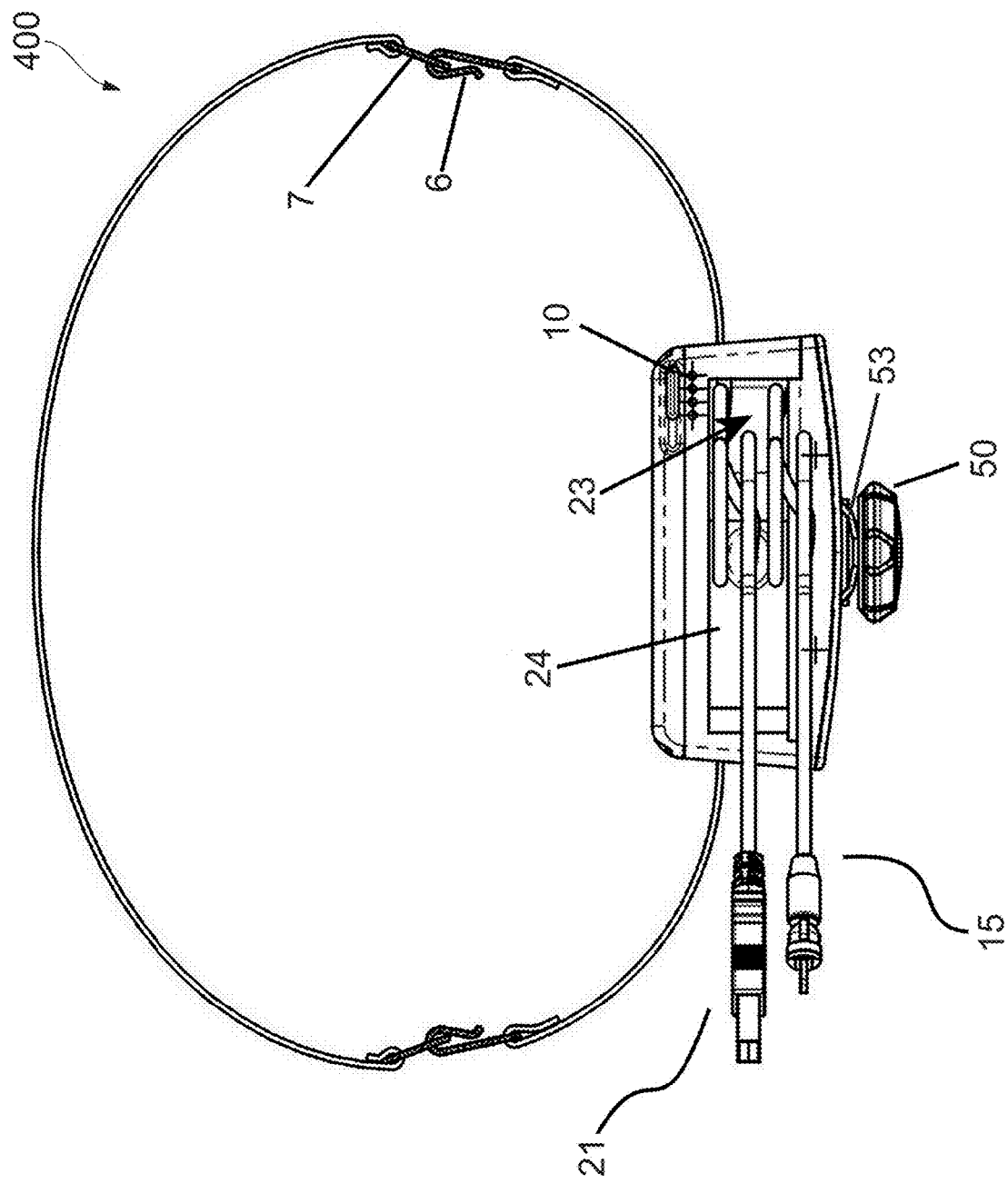
FIG. 10 shows a top view of the fourth embodiment of the belt as shown in FIG. 9.
Figure 11:
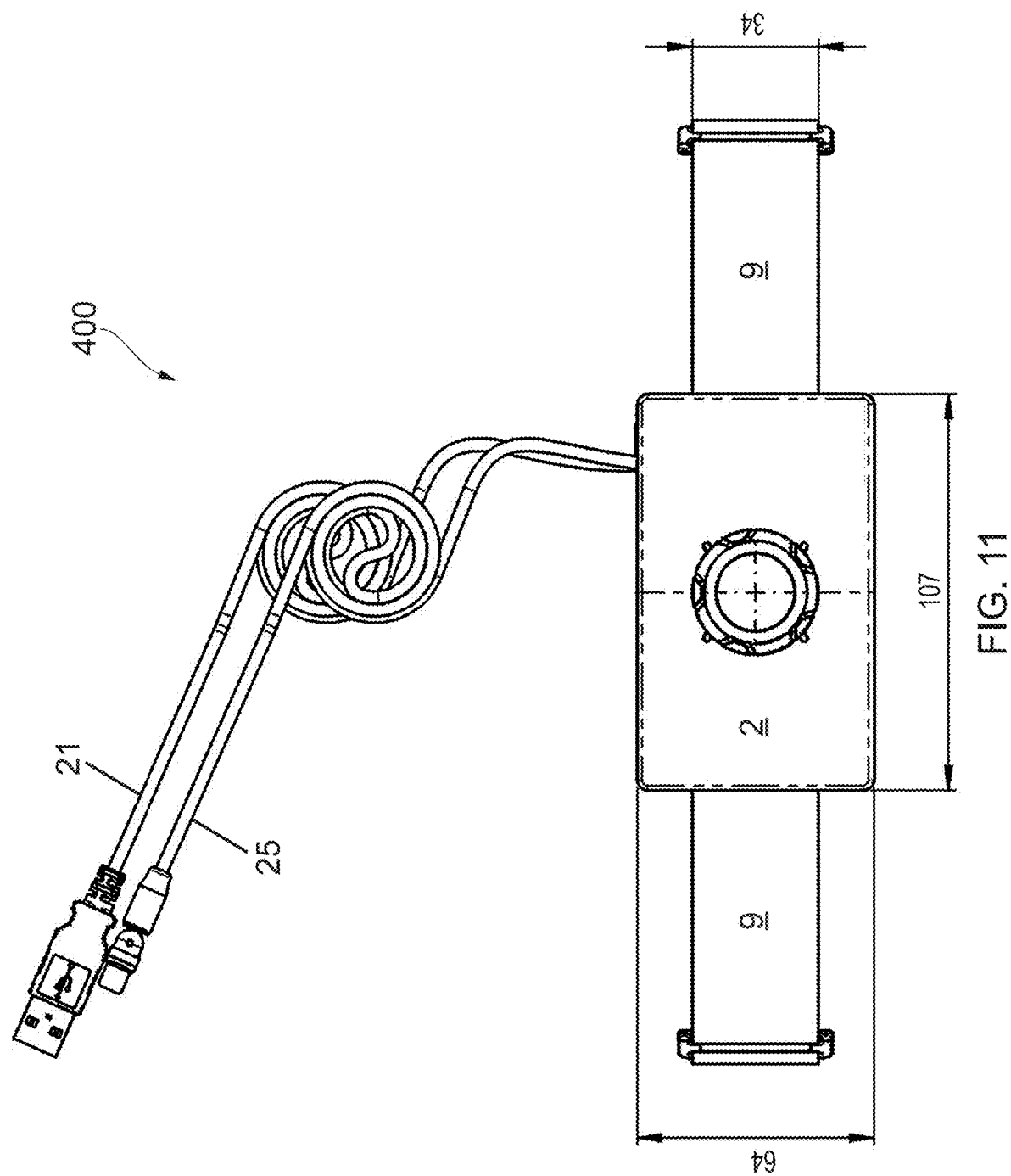
FIG. 11 shows a front view of the fourth embodiment of the belt as shown in FIG. 9.
Figure 12:
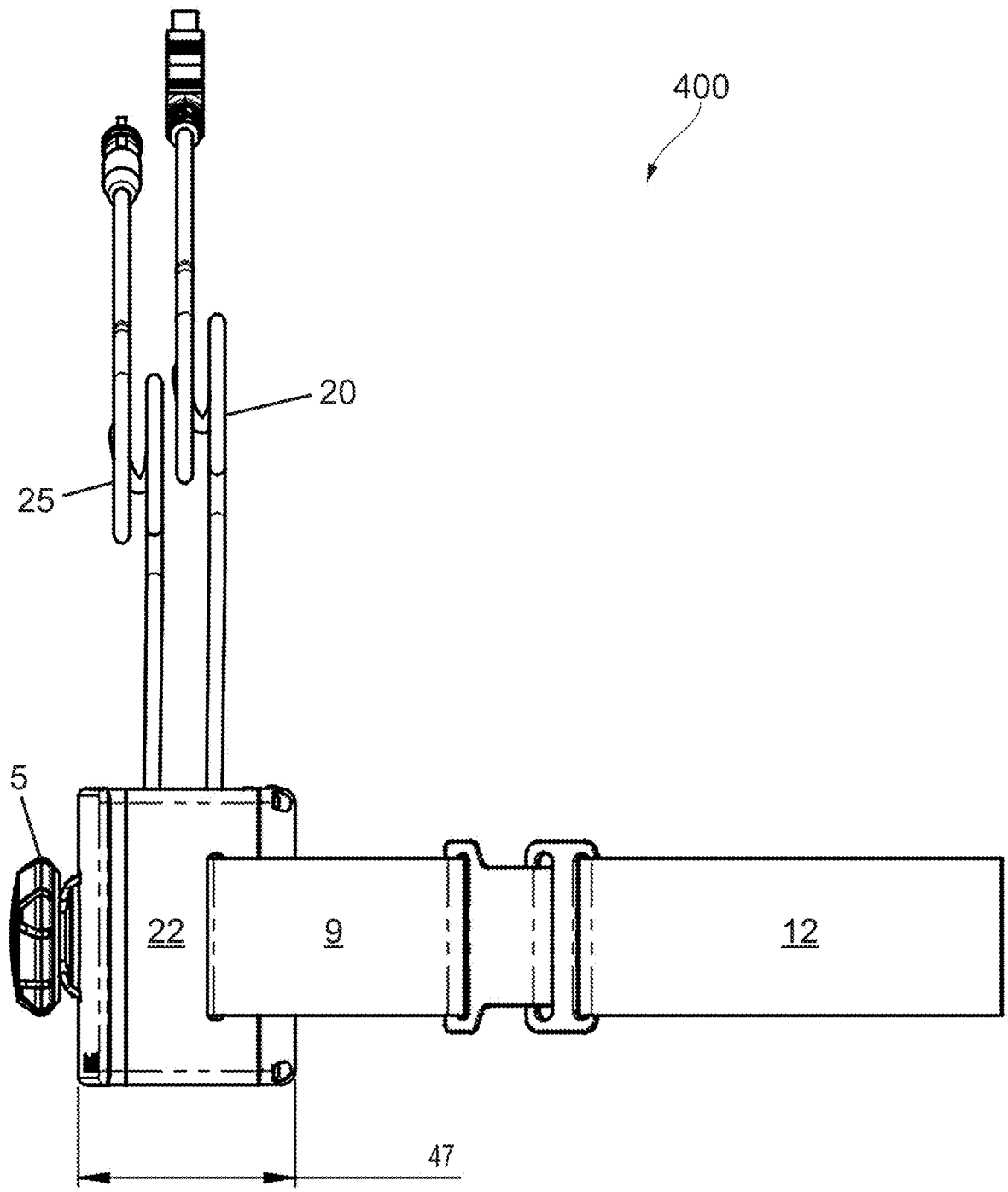
FIG. 12 shows a side view of the fourth embodiment of the belt as shown in FIG. 9.
Figure 13:
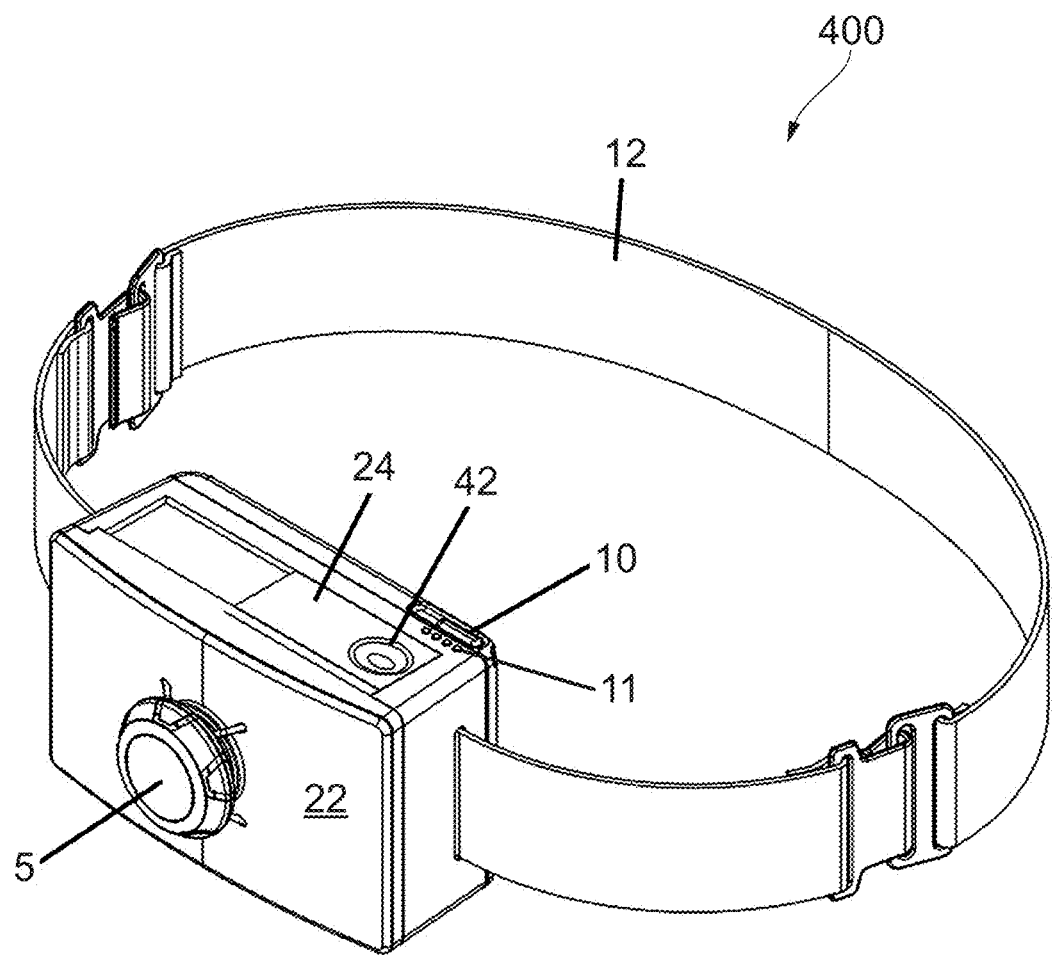
FIG. 13 shows an isometric view of the fourth embodiment of the belt as shown in FIG. 9, with the charging cable retracted.
Figure 14:
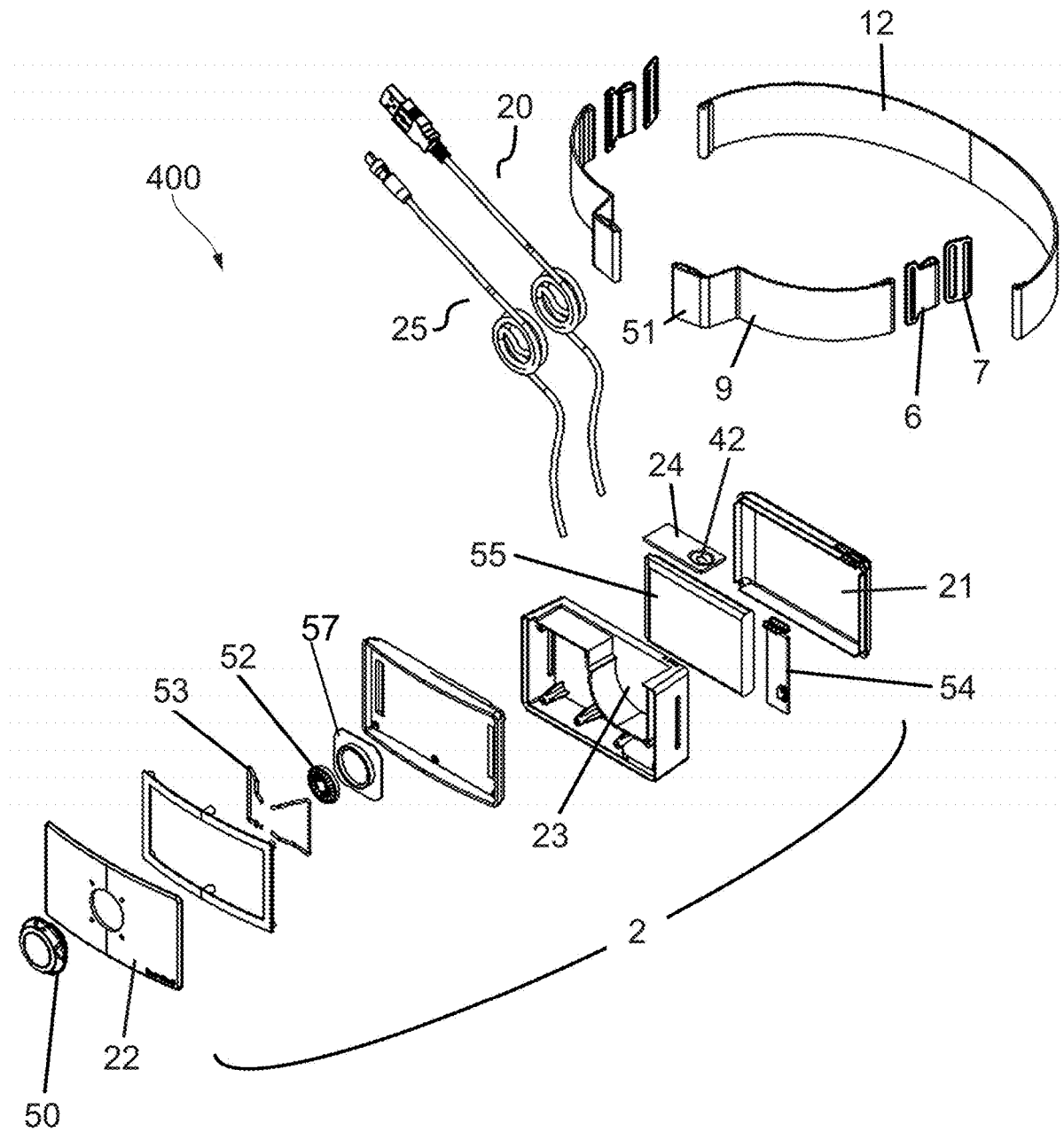
FIG. 14 shows an exploded isometric view of the fourth embodiment of the belt as shown in FIG. 9.

With reference to the Figures there are five embodiments 100, 200, 300, 400, 500 of the belt. Like parts have like references.

In all embodiments there is provided a buckle housing 2 that contains the rechargeable battery 55. From the buckle housing 2 extend belt portions 9 that are adjusted in length by an adjustment mechanism 5.

All embodiments have at least one charging cable 15, 20, 25, 35 that is connected to the battery 55 at a connection point 56. The charging cable(s) 15, 20, 25, 35 is stored in (see FIGS. 5 to 19) or around (see FIGS. 1, 2 and) the buckle housing 2.

In the embodiments 100, 200 shown in FIGS. 1 to 4 the belt member is formed from two parts 9A and 9B which can connect directly to the waistband of a garment, for example attaching to waistband belt loops by clips 6. In this way the belt 100 only passes part way around the wearer's waist, typically the front part of the wearer's waist. Alternatively, in some embodiments the length of the two parts 9A, 9B may enable the two parts to be connected to each other to form a continuous loop around the wearer.

In the embodiments 300, 400, 500 shown in FIGS. 5 to 19 the belt members 9A, 9B that extend from the buckle housing 2 are joined to a second section 12 to form a continuous loop around a wearer. It is appreciated that the belt shown in embodiments 300, 400 and 500 may be donned without the use of the second section 12, thereby connecting to the garment as described above, or by connection of ends of the two belt portions 9A, 9B to each other.

Preferably the belt members 9A, 9B and second section 12 are not elastic, for example being cotton or Nylon (RTM) webbing.

The battery 55 is contained within a buckle housing 2.

The buckle housing 2 also houses an adjustment mechanism 5 which enables the belt members 9A, 9B to be adjusted in length from a first length to a second length.

In the pictured embodiments the adjustment mechanism 5 has a reel 52 that is internally connected to proximal ends of the belt members 9A, 9B so that the belt members 9A, 9B can be retracting into, or extended from, the buckle housing 2 to adjust their length.

In the pictured embodiments 300, 400, 500 shown in FIGS. 5 to 19 the second section (connecting part) 12 is a fixed length and in use will be the opposing side of the user, passing around the wearer's back.

The second section 12 and the belt members 9A, 9B are arranged with an attachment means 1, which allows connection of the distal ends 7 of the second section with the distal ends 6 of the belt members 9A, 9B to form the complete loop around a wearer's s waist.

The connecting parts of the attachment means 1 comprise mating clasps, 6,7, typically formed in stainless steel, although it is appreciated that other materials may be used.

In this way the second section 12 can be easily connected to the belt members 9A, 9B to form the belt and either attachment means 6, 7 can be undone to provide a break in the belt so that it can be removed.

FIGS. 1A, 1B, 1C and 1D, and 2A, 2B, 2C and 2D show first and second embodiments that vary only in size and in that the second embodiment 200 includes light emitting diode indicators 11 to reflect charging status. The first embodiment 100 is larger than the second embodiment 200. Preferred dimensions in millimetres are included to show examples of the buckle housing dimensions.

The buckle housing 2 is rectangular and is curved to correspond to the curvature of a wearer's waist. The battery 55 is housed within the buckle housing 2 and is connected to a printed circuit board (PCB) 54. The charging cable 15 is connected to the battery 55 via the PCB 54 (see the exploded view in FIG. 3).

The buckle housing 2 has a front face 22 and rear face 21 that encase an internal wall 26 that is shaped and dimensioned to receive the battery 55 on one face and the adjustment mechanism 5 on the opposed face. In this way the internal wall 26 acts as a mount that is sandwiched between the front and rear faces of the housing 22, 21. The front 22 and rear 21 faces of the buckle housing 2 are joined by a set of four screws 27 (see FIG. 4).

Proximal ends of the belt portions 9A, 9B are connected to the adjustment mechanism 5.

Distal ends of belt portions 9A, 9B have a clip 6 for connecting to either: a garment (forming a belt that passes part way around a user's waist); or to connect one clip 6 to the other (forming a belt that passes completely around a wearer's waist); or to connect to a corresponding clip 7 on the second section 12 (to form a continuous belt around a wearer's waist).

In FIGS. 1 and 2 the adjustment mechanism 5 is a Fidlock Winch (RTM). A dial 50 is provided on the outer face of the front face 22 of the housing 2 which is turned or released to lengthen or shorten the belt members 9A, 9B that are connected to the adjustment mechanism of the Fidlock Winch (RTM).

The dial 50 is connected to the reel 52 to form a single part that connects in use to the base 57. The single part (50, 52) connects to the base 57 by a magnetic connection and there are separable to release the cord 53. There is an engagement means (not shown) between where the reel 52 and base 57 engage. Both interfacing surfaces have corresponding teeth that engage so that the reel 52 can be turned in one direction to tighten the belt portions 9A, 9B and will not unwind until the single part 50, 52 is released from the base 57.

In FIGS. 1B, 1C, 2B and 2C the charging cable 15 is shown wrapped around a perimeter edge of the buckle housing 2 when not in use. A cable holder 16 is provided to secure the cable 15 in place when not deployed for use. The buckle housing 2 has a groove 17 in which the cable 15 sits (see FIGS. 1A and 2A).

It is appreciated that in an embodiment with a displaceable cable, the buckle housing may have no modifications to store a cable. For example the buckle housing may have a smooth exterior finish and the cable connected via the port (socket) when required.

The cable is not shown in FIGS. 1A, 1D, 2A and 2D.

In FIGS. 5 to 18 the buckle housing 2 has a compartment in which the cable(s) is received when not in use.

In FIGS. 5 to 8 (third embodiment 300) the front face 22 of the buckle housing 2 has a socket 8 for receipt of a charging cable 15. The socket 8 is covered by a displaceable tethered silicone plug to minimise any water or dust ingress in use. Therefore in this embodiment the charging cable 15 is displaceable from the socket 8.

In FIGS. 5 to 8 the buckle housing 2 contains one extendable charging cable 15, which is provided on a cable reel 3 situated a little way along the cable 15. This allows the wire remainder 4 (distal end of the cable 15) to be wound onto the cable reel 3. The cable reel 3 may be a reel that is common in the art such as with a plastic casing covering the reel.

The charging cable 15 has a magnetic end 13, which allows for a plug to be added and removed so that a plurality of different plugs can be provided on the one charging cable 15. The different plug heads 14 are connected mechanically and electrically using a magnetic connection. It is appreciated that a mechanical connection without use a magnetic means may also be used.

With reference to the fourth embodiment 400 shown in FIGS. 9 to 16 this buckle housing 2 has an internal compartment 23 which is accessed through an opening that is closed by a sliding cover 24 in an upper side of the housing 2. The cover 24 comprises a thumb slider depression 42 to aid with movement of the cover 24.

The fourth embodiment 400 has two charging cables 20, 25. There is a long incoming charging cable 20 and a long outgoing charge cable 25, which are both permanently connected to the internal battery 55. The cables 20, 25 are loose (not on a reel) and arranged to be pushed or stuffed into the compartment 23 when not in use.

On the front face 22 of the housing 2 there is a dial 50 which provides the control means for the adjustment mechanism 5 and is used to retract the ends of the belt members 9A, 9B into the housing 2 during tightening to the second length. The dial 50 connects to a reel 52 and the dial 50 and reel 52 are received to a base 57. The base 57 and reel 52 are within the housing 2 and the dial 50 extends from an outer front face 22 of the housing 2.

The dial 50 has a plurality of external ridges to aid in purchase of a user's fingers against the dial 50.

Internally the proximal ends of the belt members 9A, 9B have looped ends 51 (see FIG. 15) which receive a cord 53 that engages with the reel 52 of the adjustment mechanism 5.

In other embodiments ends of the belt members 9 may have a plurality of pins along their edges that engage with the adjustment mechanism 5 to enable incremental adjustment.

Figure 15:
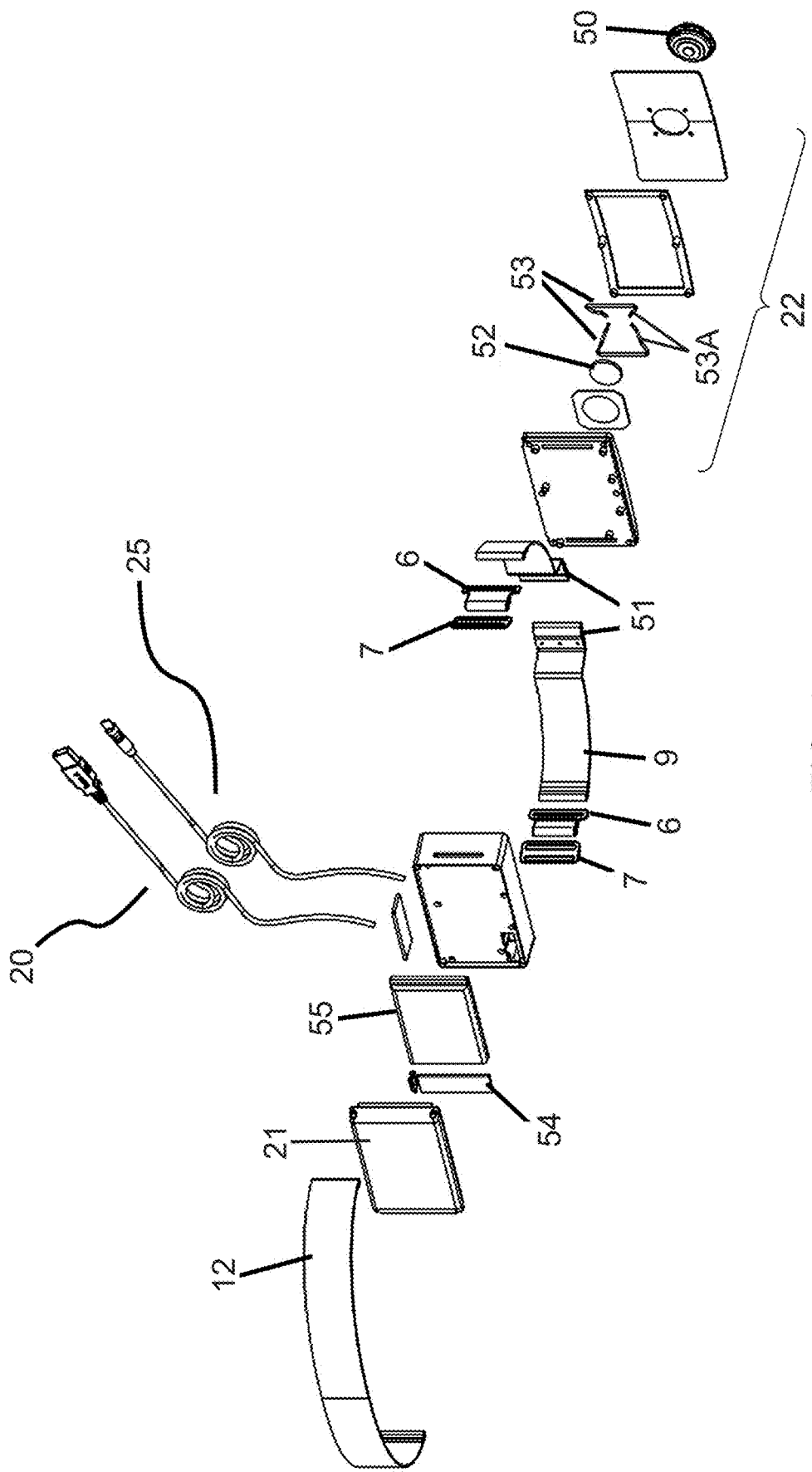
FIG. 15 shows a reverse exploded isometric view of the fourth embodiment of the device as shown in FIG. 9.
Figure 16:
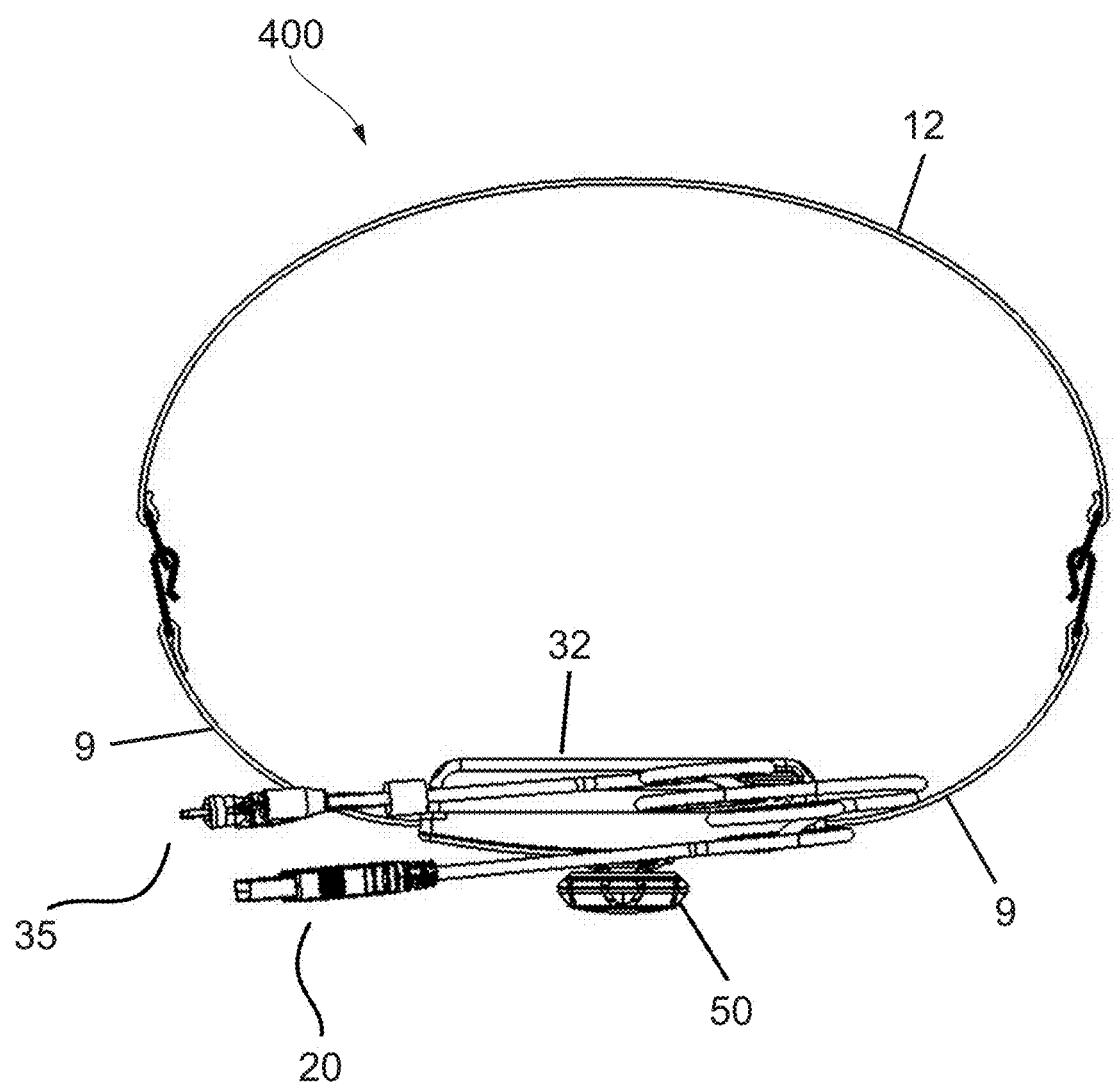
FIG. 16 shows a top view of a fifth embodiment of the belt according to the present invention, with cable extended.
Figure 17:
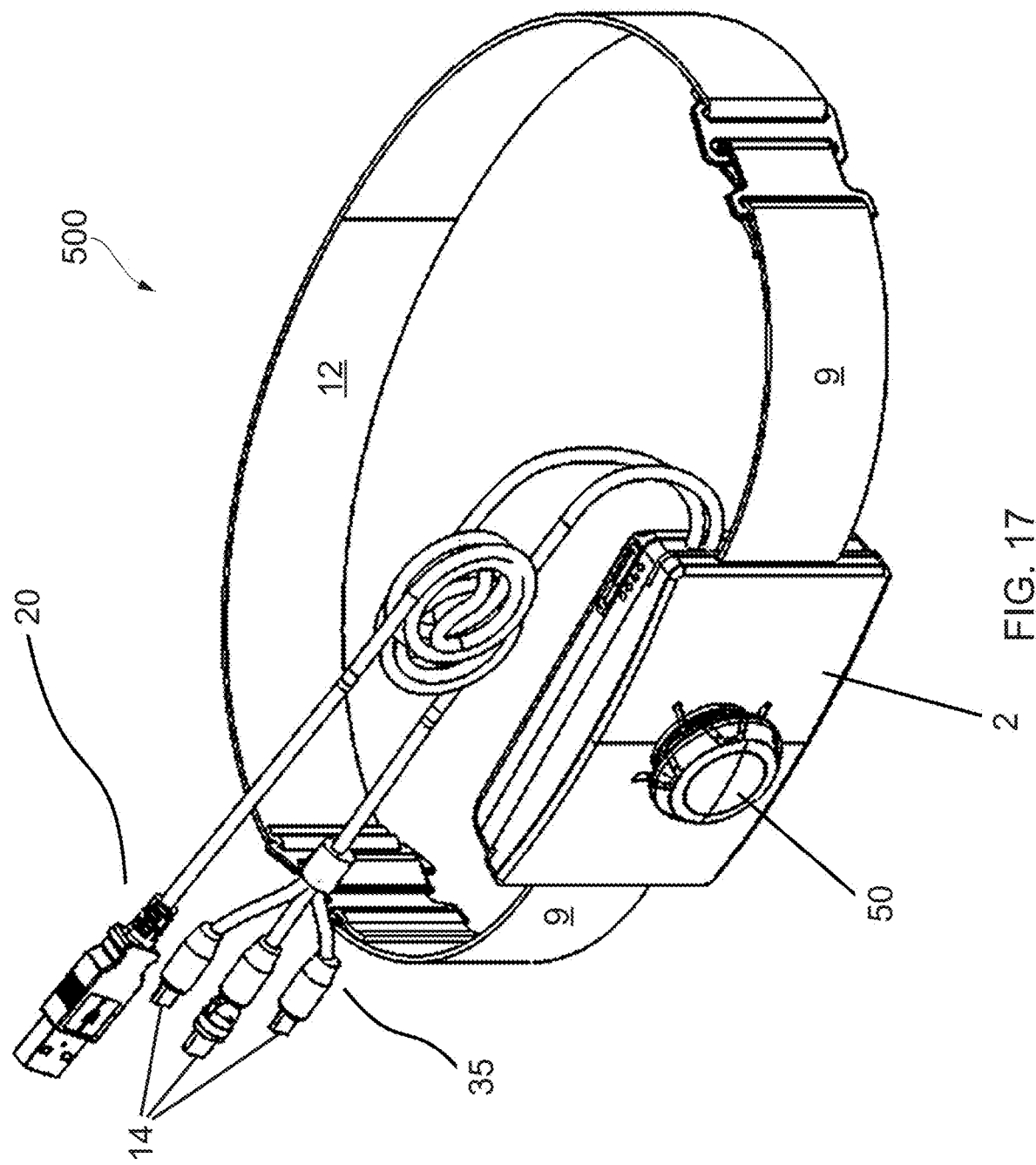
FIG. 17 shows an isometric view of the embodiment of the belt as shown in FIG. 16.
Figure 18:
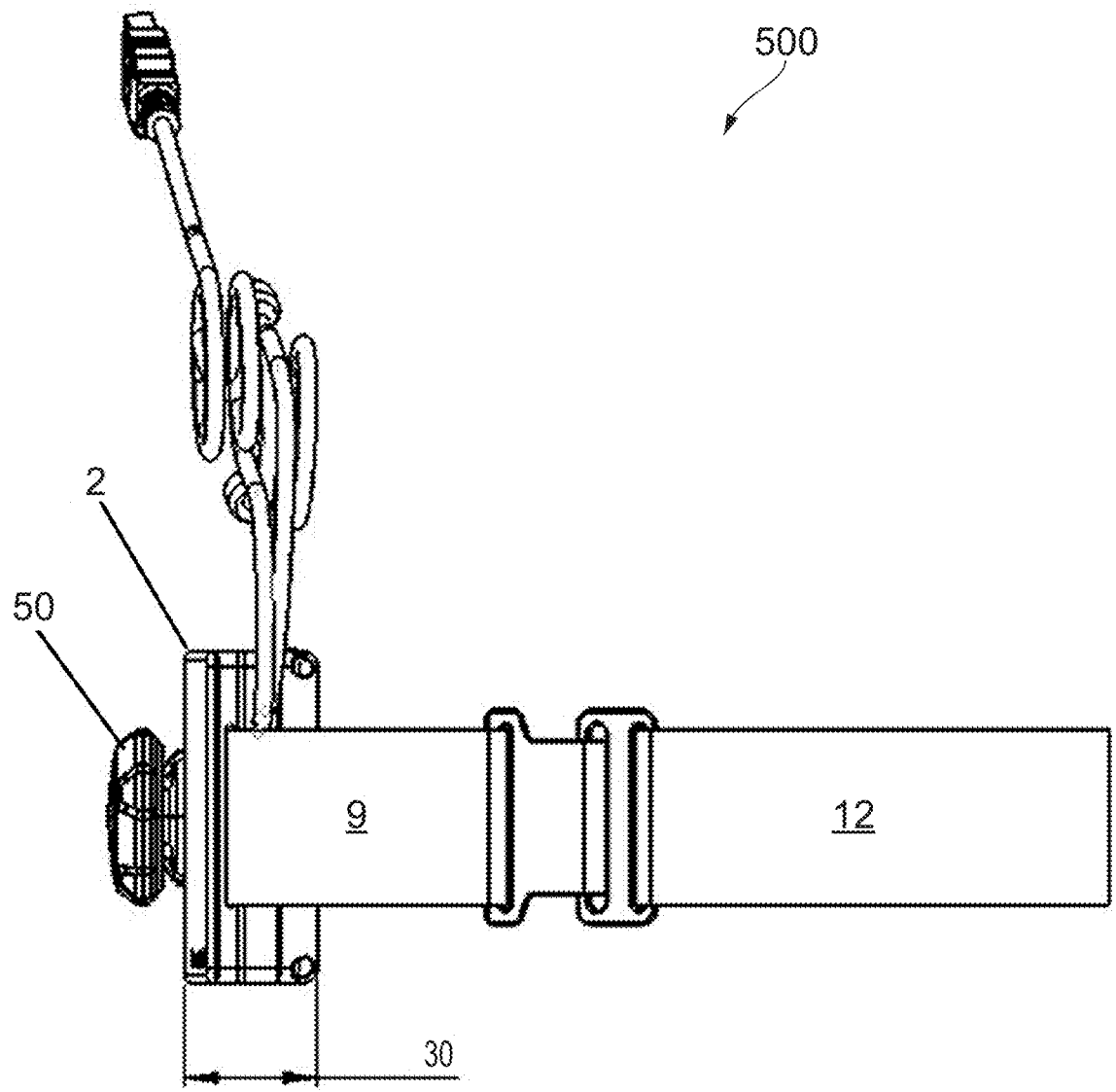
FIG. 18 shows a side view of the fifth embodiment of the belt as shown in FIG. 16.
Figure 19:
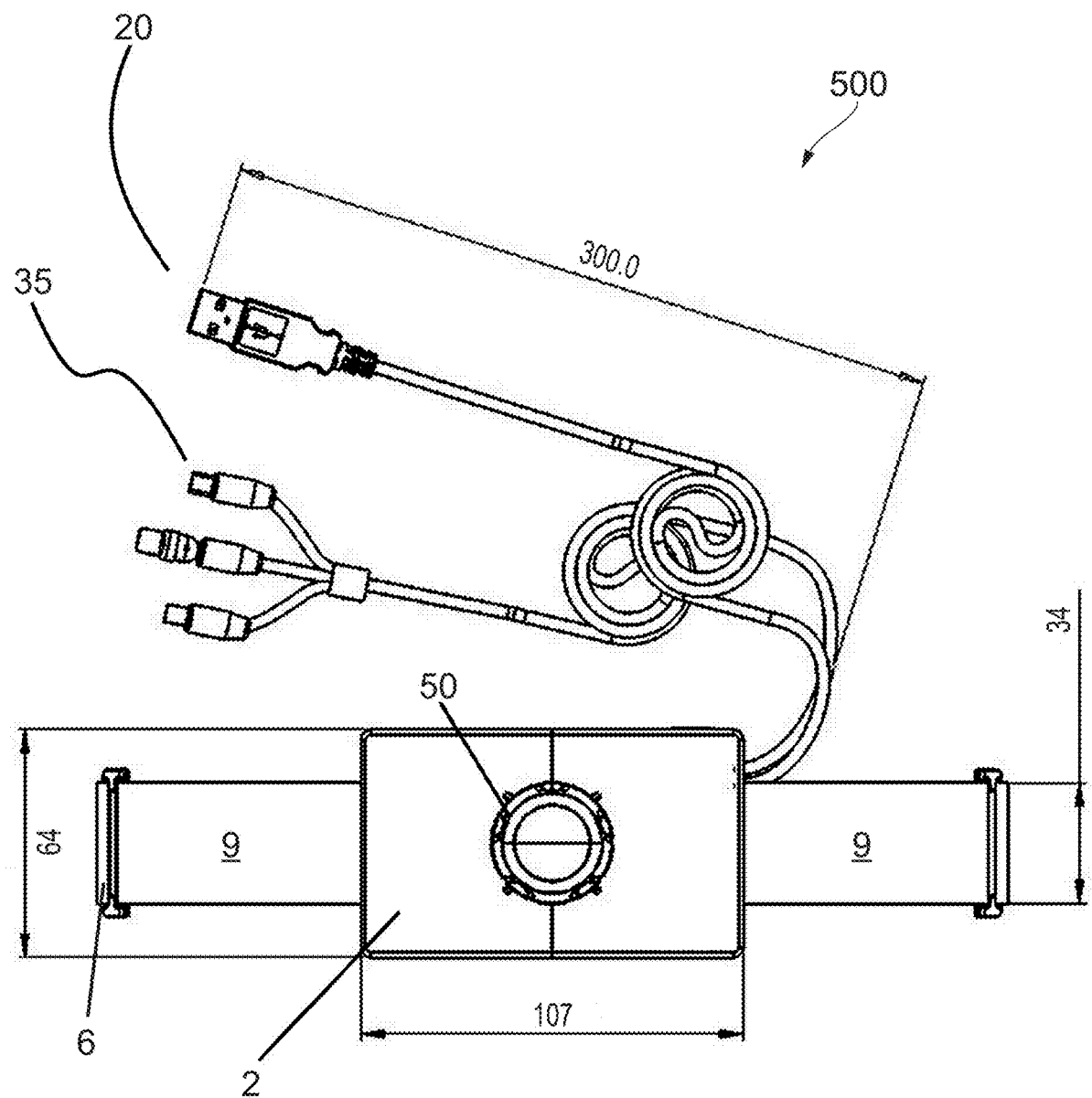
FIG. 19 shows a front diagrammatic view of the fifth embodiment of the belt as shown in FIG. 16.

In the fourth embodiments 400 shown in FIG. 15 the adjustment mechanism 5 is a reel mechanism formed of a dial 50, reel 52, and cord 53 which is wound around the reel 52 that engages with the dial 50. Each cord has pins 53A embedded in the cord for engagement with the reel 52, base 57 and dial 50. The embedded pins 53A enable accurate adjustment and to prevent slippage.

The dial 50 is connected to the reel 52 such that the dial is turned to wind the cords 53 around the reel 52, which causes the proximal ends of the s belt members 9A, 9B to be pulled towards each other and the belt members 9A, 9B are thereby shortened to the second length.

The pictured embodiments all internally include a battery 55. In the first embodiment 100, second 200, and fourth embodiments 400 there is also shown a printed circuit board 54.

The PCB 54 may allow automated control of rotation of the reel 52 through a slider button 10, as is shown on both the third 300 and fourth 400 embodiments. The slider button 10 provides an activation control for charging (acting as a switch to turn on and off charging), and a plurality of light emitting diodes 11 (LEDs) to indicate charge status, such as charging on/charging off/level of charge etc.

With reference to the fifth embodiment 500 as shown in FIGS. 16 to 19 the belt has two charging cables 20, 35. One of the cables 35 comprises multiple plug heads 14 for the outgoing charge cable 35, so as to enable connection to a plurality of socket types for different electrical devices (not shown).

Both charging cables 20, 35 are stored within the buckle housing 2 and are accessed through an opening in the side edge. The cables 20, 35 are free and not on a reel.

The housing 2 has a reduced depth relative to the third and fourth embodiments 300, 400 such that the dial 50 extends further forward of the housing.

The Figures include some preferred dimensions of the belt 100, 200, 300, 400, 500, but it is appreciated that the dimensions in millimetres are only an example of what the dimensions may be.

The invention has been described by way of examples only and it will be appreciated that variation may be made to the above-mentioned embodiments without departing from the scope of protection as defined by the claims.

The invention claimed is:

1. A belt with at least one rechargeable battery comprising: a buckle housing that contains the at least one rechargeable battery and a reel adjustment mechanism to adjust length of one or more belt member including a reel that accepts a cord associated with the proximal end of the belt member(s) and a dial connected to the reel that is turned to adjust length of the belt member(s) extending from the buckle housing wherein the reel mechanism is a dial and reel connect to form a single part that connects to a base by a magnetic connection; the base and single part engage by a ratchet type mechanism engagement means so that incremental adjustment can be achieved and unwinding is prevented until the magnetic connection between the single part and the base is broken to release the single part from the base and wherein the at least one rechargeable battery is connected to or connectable to a charging cable for connecting to an electrical device to be charged or for connection to a power supply to charge the rechargeable battery.

2. The belt according to claim 1 further including two belt members, one extending from each opposed end of the buckle housing; wherein distal ends of each belt member have an attachment means to connect to a garment, each other, or to a second section.

3. The belt according to claim 2 wherein the attachment means comprises a hook or a clip.

4. The belt according to claim 1 wherein the reel mechanism includes a base mounted on the buckle housing that receives the dial and reel as a single part.

5. The belt according to claim 1 further including an engagement means between the single part and the base.

6. The belt according to claim 5 wherein the engagement means is a ratchet mechanism to allow incremental adjustment.

7. The belt according to claim 1 wherein the at least one rechargeable battery has a port for receiving the charging cable.

8. The belt according to claim 1 further including a charging cable wherein a distal end of the charging cable has a plurality of plugs for receiving different electrical devices.

9. The belt according to claim 1 further including a charging cable wherein a distal end of the charging cable has a plug a for connection to a power supply to enable the rechargeable battery to be charged.

10. The belt according to claim 1 further including a charging cable.

11. The belt according to claim 1 wherein the charging cable comprises at least one universal serial bus plug on at least one end.

12. The belt according to claim 1 wherein the buckle housing provides a storage compartment for the charging cable(s).

13. The belt according to claim 1 further comprising a cable wheel for the charging cable(s).

14. The belt according to claim 1 wherein the belt member is formed from webbing and has a cord at a proximal end that connects to the adjustment mechanism.

15. The belt according to claim 1 wherein at least part of the belt member is elastic.

16. The belt according to claim 1 further including a second section for connection to the belt member(s) to form a continuous loop around the whole of a wearer's waist.

17. The belt according to claim 1 wherein the buckle housing has at least one indicator to display charging status and/or battery level.

18. A belt according to claim 17 wherein the at least one indicator is a light.

19. A belt according to claim 17 wherein the at least one indicator is a display.

\* \* \* \* \*